United States Patent
Kondo et al.

(10) Patent No.: US 6,442,297 B1
(45) Date of Patent: Aug. 27, 2002

(54) STORAGE APPARATUS AND WRITING AND/OR READING METHODS FOR USE IN HIERARCHICAL CODING

(75) Inventors: Tetsujiro Kondo, Tokyo; Akihiro Okumura, Kanagawa, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/241,683

(22) Filed: Feb. 1, 1999

(30) Foreign Application Priority Data

Feb. 3, 1998 (JP) .......................................... 10-022172

(51) Int. Cl.[7] .............................. G06K 9/46; H04N 7/12
(52) U.S. Cl. .................. 382/240; 382/238; 375/240.11; 375/240.12
(58) Field of Search ................................ 382/240, 232, 382/238; 341/67, 79; 345/536; 375/240.11, 240.12, 240.19, 240.24

(56) References Cited

U.S. PATENT DOCUMENTS

| | | | | |
|---|---|---|---|---|
| 5,251,046 A | * | 10/1993 | Kato et al. | 358/457 |
| 5,703,652 A | * | 12/1997 | Kondo et al. | 348/421 |
| 5,825,313 A | * | 10/1998 | Kondo et al. | 341/67 |
| 5,859,667 A | | 1/1999 | Kondo et al. | 375/240.14 |
| 5,930,394 A | | 7/1999 | Kondo et al. | 382/232 |
| 5,959,676 A | | 9/1999 | Konodo et al. | 348/421.1 |
| 6,252,989 B1 | * | 6/2001 | Geisler et al. | 382/232 |

FOREIGN PATENT DOCUMENTS

| | | | | |
|---|---|---|---|---|
| JP | 09098369 A | * | 4/1997 | H04N/5/907 |
| JP | 09102951 A | * | 4/1997 | H04N/7/24 |

OTHER PUBLICATIONS

"A New Median Adaptive Predictor with Applications in Subband Coding," Marusic et al, 1997 IEEE International Symposium on Circuits and Systems, Jun. 9–12, 1997, pp. 1269–1272.*

"Comparative Performance on Pyramid Data Structures for Progressive Image Transmission," Goldberg et al, IEEE Trans. on Communications, vol. 39, No. 4, Apr. 1991, pp. 540–548.*

L. Wang, Reduced–difference pyramid: a data structure for progressive image transmission optical Engineering, Jul. 1999, vol. 28, No. 7, pp. 708–716.

* cited by examiner

Primary Examiner—Wenpeng Chen
(74) Attorney, Agent, or Firm—Frommer Lawrence & Haug LLP; William S. Frommer; Dennis M Smid

(57) ABSTRACT

Apparatus and method for performing hierarchical coding without utilizing a delay circuit arranged separately from a memory for storing images. In the case where one second-layer pixel is formed from 2×2 first-layer pixels, three of the 2×2 first-layer pixels used to form the one second-layer pixel (excluding one final input pixel) are read out from a first-layer memory when the final input pixel is input. The three pixels read out are supplied to an adder which computes the sum thereof and supplies the sum value to an adder-subtracter. The adder-subtracter computes the sum of the sum value from the adder and the final input pixel so as to obtain the one second-layer pixel. Such second-layer pixel is supplied to a second-layer memory to be stored therein. The final input pixel is not stored in the first-layer memory.

25 Claims, 13 Drawing Sheets

 : MASKED BITS

|  | 2s | 2s+1 | 2s+2 | 2s+3 | 2s+4 |  |
|---|---|---|---|---|---|---|
| 2t | W | W | W | W | W | |
| 2t+1 | W |  | W |  | W | |
| 2t+2 | W | W | W | W | W | FIRST LAYER |
| 2t+3 | W |  | W |  | W | |
| 2t+4 | W | W | W | W | W | |
|  |  |  |  |  |  | W : WRITE |

STORAGE APPARATUS AND WRITING AND/OR READING METHODS FOR USE IN HIERARCHICAL CODING

BACKGROUND OF THE INVENTION

The present invention relates to a storage apparatus, a writing method and a reading method and, more particularly, to such apparatus and methods suitable for use in performing hierarchical coding for forming images in hierarchical order having different number of pixels.

In a hierarchical coding method, high-resolution image data is set as image data in a lowermost layer or a first layer, image data in a second layer is formed of a number of pixels smaller than the number of first-layer pixels, image data in a third layer is formed of a further smaller number of pixels, followed by formation of image data from a fourth layer to a predetermined uppermost layer. Image data in each layer may be displayed on a monitor having a resolution (a number of pixels) corresponding to the layer. Accordingly, a user can select image data (hierarchically coded image data) corresponding to the resolution of the user's monitor to view corresponding images. As an example, an image corresponding to one layer can be used for enlargement of an image corresponding to one of the respective higher layers in such a manner that, when the image corresponding to the higher layer is displayed, it is replaced with the image corresponding to the lower layer by a user operation or the like.

In setting image data having a certain resolution as image data of the lowermost layer (first layer), successively forming image data of upper layers, and storing or transmitting the image data of all the layers, a storage capacity or transmission capacity for the image data of the upper layers is required in addition to that for storage or transmission or the like of the image data of the lowermost layer only. A hierarchical coding method has been proposed which prevents such increase in storage capacity or the like. This method will be herein below described with respect to a three-layer hierarchical coding situation in which the sum of the values of four pixels, i.e., 2×2 column and row arrangement of four pixels, is set as a pixel (pixel value) of an upper layer.

In FIG. 16, the 4×4 arrangement of pixels are the pixels of the lowermost-layer image. A sum of the four pixel values h00, h10, h01, and h11 of such 4×4 arrangement is calculated and set as an upper left pixel m0 of a second layer which is a 2×2 pixel arrangement. Similarly, a sum m1 of the four pixel values h20, h30, h21, and h31, a sum m2 of the four pixel values h02, h12, h03, and h13, and a sum m3 of the four pixel values h22, h32, h23, and h33 are calculated and set as an upper right pixel, a lower left pixel, and a lower right pixel, respectively, of the second layer. Further, a sum q0 of the four pixel values m0, m1, m2, and m3 of the 2×2 pixels in the second layer is calculated and set as a pixel of a third-layer image, which is the uppermost layer in this situation.

If all of the pixels h00 to h33, m0 to m3, and q0 described above are stored in their respective original forms, an additional storage capacity or the like corresponding to the second-layer pixels m0 to m3 and third-layer pixel q0 is required, as mentioned above. As a result, the third-layer pixel q0 may be set at the position corresponding to the lower right pixel m3 in the second-layer, as shown in FIG. 16, wherein the second layer is formed of pixels m0 to m2 and q0. Further, the second-layer pixel m0 may be set at the position corresponding to the lower right pixel h1 in the first-layer, as shown in FIG. 16. (Recall that m0 may be obtained from h00, h10, h01, and h11 of the first layer.) Similarly, the other second-layer pixels m1, m2, and q0 may also be set in pixels h31, h13, and h33 of the first layer. Although pixel q0 is not obtained directly from the first-layer pixels h22, h32, h23, and h33, pixel q0 (instead of pixel m3) is set at the position corresponding to pixel h33 because it is set in the second layer in place of m3 which was obtained directly from the first-layer pixels h22, h32, h23, and h33.

Thus, in the above-described situation, a total of 4×4 or sixteen pixels may be formed. Such number of pixels is the same as that of the lowermost layer. As such, an increase in storage capacity or the like can be prevented.

Decoding of the above-described pixel q0 (which replaced m3 and h33) and pixels m0 to m2 (which respectively replaced pixels h11, h31, and h13) can be performed as described below.

That is, the value of q0 is the sum of m0 to m3 (i.e., q0=m0+m1+m2+m3). Therefore, m3 can be obtained from the equation m3=q0−(m0+m1+m2). Also, m0 is the sum of h00, h10, h01, and h11 (i.e., m0=h00+h10+h01+h11). Therefore, h11 can be obtained from the equation h11=m0−(h00+h10+h01). Each of h31, h13, and h33 may be obtained in a similar manner. The pixel h33 is obtained upon obtaining m3, as described above.

In the above-described hierarchical coding, a delay circuit for performing line delay of lower-layer pixels (pixel values) is utilized as well as a versatile memory (for example, a static random access memory (SRAM) or a dynamic RAM (DRAM)) for storing results of such hierarchical coding. As an example, and with reference to FIG. 16, an operation may be performed relating to the equation m0=h00+h10+h01+h11 to obtain the second-layer pixel m0, which utilizes first-layer pixels h00, h10, h01, and h11 in two lines. Image data may be supplied to (or written into) a memory in a predetermined order, such as a line scanning order from left to right and from top to bottom with respect to an arrangement of pixels. Image data may also be read out from the memory in line scanning order with respect to the pixels. Therefore, to obtain the second-layer pixel m0, an operation is performed in which the line starting at h00 is delayed by one line and one pixel to await supply of h01 and h11 of the line starting at h01, m0 is calculated and then the line starting at h00 is thereafter written to the memory.

Thus, in the above-described coding technique, a delay circuit for performing line delay of image data in addition to a memory for storing results of hierarchical coding may be utilized, thereby increasing the size of the respective coding apparatus and hindering the processing speed thereof.

OBJECTS AND SUMMARY OF THE INVENTION

An object of the present invention is to provide a hierarchical coding technique which does not utilize a delay circuit as in the above-described hierarchical coding apparatus.

Another object of the present invention is to provide a hierarchical coding apparatus having a relatively small size and capable of high-speed processing.

In accordance with an aspect of the present invention, a storage apparatus is provided for storing a first image corresponding to a low layer and having a plurality of pixels and a second image corresponding to a high layer and having a plurality of pixels, in which a pixel of the second image is formed from N pixels of the first image, and in which the pixels of the first image are inputted one by one in a predetermined order. The apparatus comprises a low layer storage device for storing the first image corresponding to the low layer; a high layer storage device for storing the second image corresponding to the high layer; a controller for controlling read and write operations with respect to the low layer and high layer storage devices, in which the controller reading out the first image stored in the low layer storage device as a unit group of N−1 pixels; and a pixel generator for generating one pixel of the second image by using the N pixels of the first image which include the N−1 pixels of the first image read out from the low layer storage device and one input pixel of the first image.

In accordance with another aspect of the present invention, a storage apparatus is provided for storing a first image corresponding to a low layer and having a plurality of pixels and a second image corresponding to a high layer and having a plurality of pixels, in which a pixel of the second image is formed from N pixels of the first image, and in which the pixels of the first image are inputted one by one in a predetermined order. The apparatus comprises a low layer storage device for storing the first image corresponding to the low layer in which the low layer storage device stores only N−1 pixels and excludes a final input pixel of the N pixels of the first image used to form the one pixel of the second image and in which the final input pixel is inputted in the N pixels of the first image and is not stored in the low layer storage device, a high layer storage device for storing the second image corresponding to the high layer in which high layer storage device stores one pixel of the second image by using the N pixels of the first image which include the N−1 pixels of the first image read out from the low layer storage device and the final input pixel of the first image, a controller for controlling read and write operations with respect to the low layer and high layer storage devices in which the controller reads out the one pixel of the second image in the high layer storage and in which the controller reads out the first image stored in the low layer storage device as a unit group of N−1 pixels, and a pixel generator for generating the final input pixel of the first image by using the one pixel of the second image read out from the high layer storage device and the N−1 pixels of the first image read out from the low layer storage device.

Other objects, features and advantages according to the present invention will become apparent from the following detailed description of illustrated embodiments when read in conjunction with the accompanying drawings in which corresponding components are identified by the same reference numerals.

DESCRIPTION OF THE PREFERRED EMBODIMENTS

Figure 1:
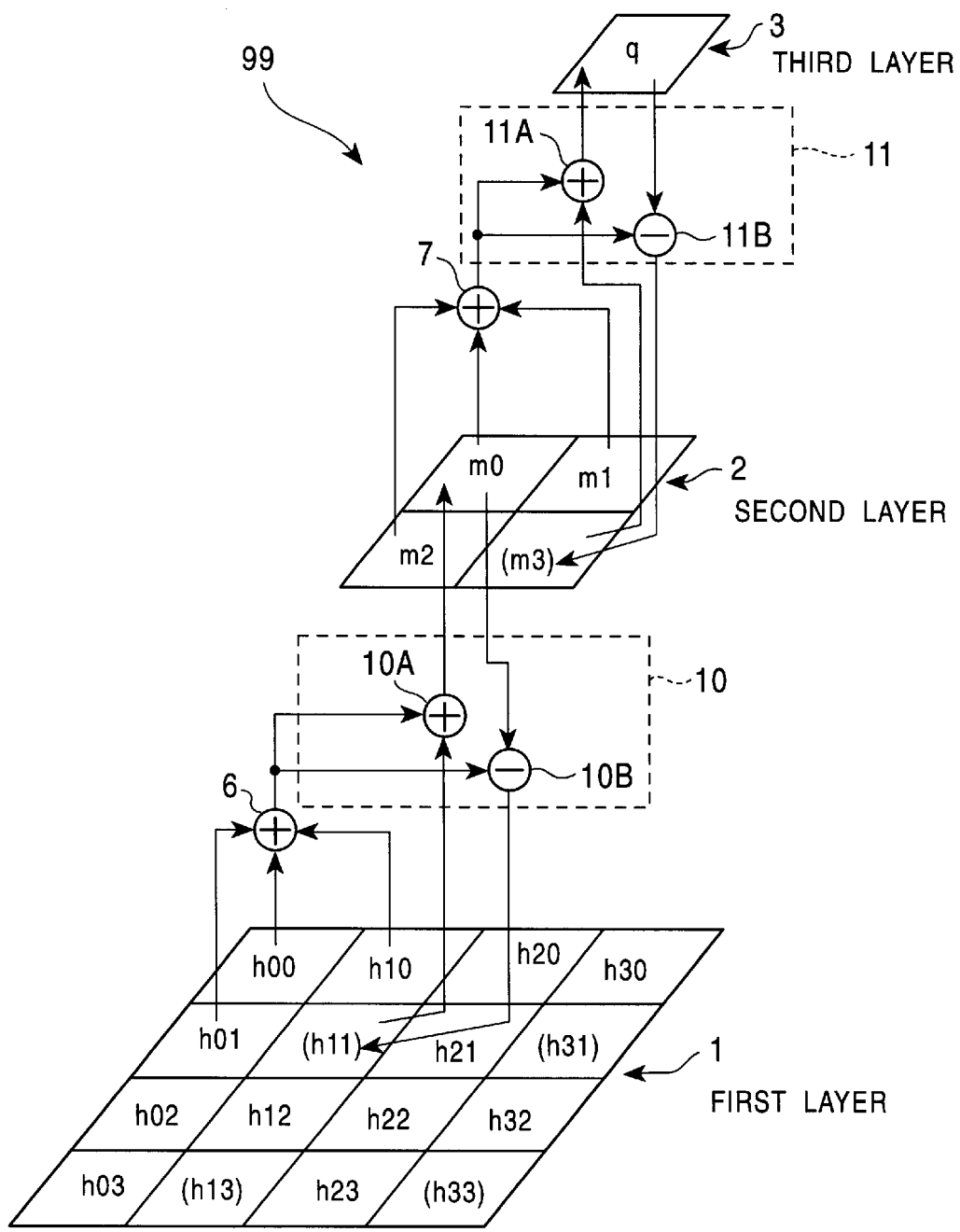
FIG. 1 is a diagram of a storage apparatus according to an embodiment of the present invention.
Figure 16:
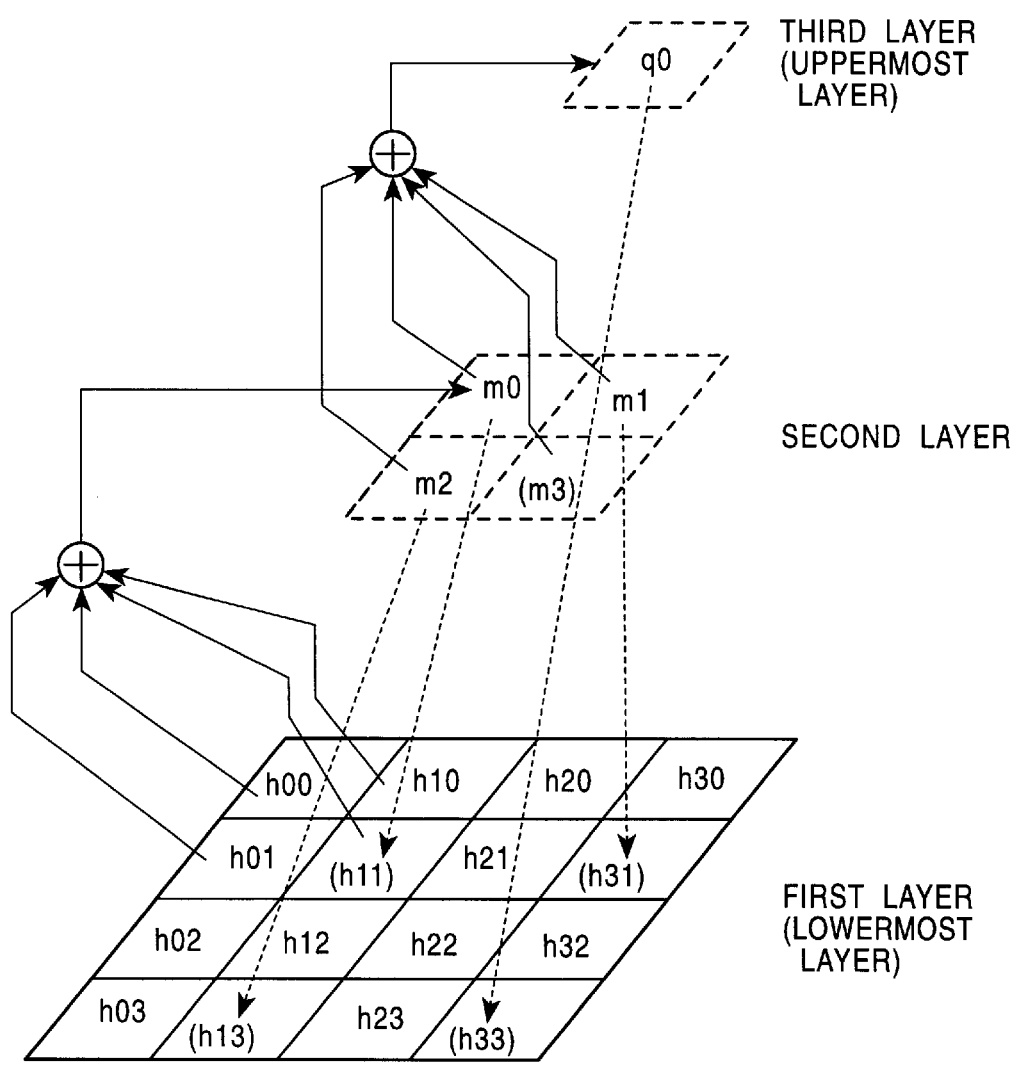
FIG. 16 is a diagram to which reference will be made in explaining a hierarchical coding technique.

FIG. 1 illustrates a storage apparatus (layer memories) in accordance with an embodiment of the present invention. As shown therein, this storage apparatus is formed of a first-layer memory 1, a second-layer memory 2, a third-layer memory 3, (wherein images of first to third layers may be respectively stored), adders 6 and 7 for adding a number of inputs such as three inputs, and adder-subtracters 10 and 11 for adding or subtracting a number of inputs such as two inputs. This storage apparatus may perform three-layer hierarchical coding similar to that described above with reference to FIG. 16, in which the sum of the values of 2×2 (four) pixels of a lower layer is obtained as a pixel (pixel value) of an upper layer. That is, in the situation illustrated in FIG. 1, there are a number of 4×4 pixels of a lowermost-layer (first-layer) image, and pixels values of these 4×4 pixels may be input in a line scanning order, that is, in the order of h00, h10, h20, h30, h01, h11, h21, h31, h02, h12, h22, h32, h03, h13, h23, and h33.

In the above case, four pixels h00, h10, h20, and h30 in the first line are successively stored in the first-layer memory 1. When inputting the second line, the first pixel h01 (in the leftmost column) is also stored in the first-layer memory 1. When the second pixel in the second line (in the second column), that is, pixel h11, (the final input pixel of h00, h10, h01 and h11 used to form second layer pixel m0) is input, the three first-layer pixels h00, h10, and h01 already stored in the first-layer memory 1 are simultaneously read out and supplied to the adder 6. The adder 6 computes the sum of first-layer pixels h00, h10, and h01 and supplies the sum value to the adder-subtracter 10. The adder-subtracter 10 also receives pixel h11. The adder-subtracter 10 is formed of an adder 10A and a subtracter 10B. In the adder-subtracter 10, the adder 10A computes the sum of pixel h11 and the sum value (h00+h10+h01) from the adder 6, thereby obtaining (forming) second-layer pixel m0. The pixel h11 is not stored in the first-layer memory 1, and pixel m0 is stored in the second-layer memory 2.

In this embodiment, the sum of the values of 2×2 four pixels in a lower layer is obtained as one pixel (pixel value) in an upper layer. A final input one of the four pixels in a lower layer which is used to form one pixel in an upper layer may be referred to herein as a final input pixel.

The third pixel h21 in the second line, supplied after pixel h11, is stored in the first-layer memory 1. When the fourth pixel in the second line, that is, pixel h31 (the final input pixel of first-layer pixels h20, h30, h21, and h31 used to form second-layer pixel m1) is input, the three first-layer pixels h20, h30, and h21 already stored in the first-layer memory 1 are simultaneously read out and supplied to the adder 6. The adder 6 computes the sum of first-layer pixels h20, h30, and h21 and supplies the sum value to the adder-subtracter 10 which also receives pixel h31. In the adder-subtracter 10, the adder 10A computes the sum of these received values so as to obtain the value of second-layer pixel m1 (i.e., m1=h20+h30+h21+h31). Pixel h31 is not stored in the first-layer memory 1, and pixel m1 is stored in the second-layer memory 2.

Similar processing may be performed with respect to first-layer pixels h02, h12, h03 and h13 which are used to obtain second-layer pixel m2. As such, first-layer pixels h02, h12, and h03 are stored in the first-layer memory 1 and the second layer-pixel m2 is obtained and stored in the second-layer memory 2.

Similar processing may be performed with respect to first-layer pixels h22, h32, h23 and h33 which are used to obtain second-layer pixel m3. As such, first-layer pixels h22, h32, and h23 are stored in the first-layer memory 1 and the second-layer pixel m3 is obtained but is not stored in the second-layer memory 2.

In the embodiment shown in FIG. 1, groups of 2×2 first-layer pixels may be used to form second-layer pixels m0 to m3, in which lower right pixels h11, h31, h13, and h33 are identified as final input pixels in the first-layer pixels for forming second-layer pixels.

A third-layer pixel q may be formed from the 2×2 pixels m0 to m3 of the second-layer in a manner similar to that described above, in which the lower right pixel m3 in second-layer 2×2 pixels m0 to m3 may be referred to as a final input pixel in the second-layer pixels for forming third-layer pixels. In this regard, when the second-layer pixel m3 is obtained in the above-described manner after inputting of the rightmost lowermost pixel h33 in the first-layer 4×4 pixels, it is recognized that the final input pixel of the second layer has been input, and a third-layer pixel (q) may be obtained from the second-layer 2×2 pixels in a manner similar to that used to obtain one of the second-layer pixels from the first-layer pixels. That is, when the final input pixel m3 of the second layer in second-layer pixels m0 to m3 used to form third-layer pixel q is input, three pixels m0 to m2 of the second layer already stored in the second-layer memory 2 are simultaneously read out and supplied to the adder 7. The adder 7 computes the sum of second-layer pixels m0 to m2 and supplies the obtained sum value to the adder-subtracter 11 which also receives the final input pixel m3. The adder-subtracter 11 may be formed of an adder 11A and a subtracter 11B. In the adder-subtracter 11, the adder 11A computes the sum of the final input pixel m3 and the sum value (m0+m1+m2) from the adder 7 so as to obtain or form the third-layer pixel q (q=m0+m1+m2+m3). The third-layer pixel q is stored in the third-layer memory 3.

A description will now be provided of reading of the pixels forming images in the first to third layers and stored in the above-described manner (hierarchically coded).

With respect to a third-layer image, pixels stored in the third-layer memory 3 may be read out and output in the same order in which they were stored. (Since only pixel q was stored as a third-layer pixel in the embodiment shown in FIG. 1, only one pixel q is read out).

With respect to a second-layer image, each of pixels m0 to m2 may be read and output from the second-layer memory 2 at the desired time. When the final input pixel m3 of the second layer is to be read out, the corresponding pixels stored in the second-layer memory 2, that is, the three pixels m0 to m2 which are used along with the final input pixel m3 to form third-layer pixel q, are simultaneously read out and supplied to the adder 7. The adder 7 obtains the sum of pixels m0 to m2 and supplies the sum value to the adder-subtracter 11. Simultaneously, the third-layer pixel q formed by using final input pixel m3 may be read out from the third-layer memory 3 and supplied to the adder-subtracter 11. In the adder-subtracter 11, the subtracter 11B subtracts the sum value obtained from the adder 7 from the pixel q so as to obtain final input pixel m3 (m3=q−(m0+m1+m2) which may be output.

With respect to a first-layer image, each of the pixels other than the final input pixels h11, h31, h13, and h33 of the first layer is read and output from the first-layer memory 1 at the desired time. When the final input pixel h11 of the first layer is to be read out, the corresponding pixels stored in the first-layer memory 1, that is, the three pixels h00, h10, and h01 which may be used together with the final input pixel h11 to form second-layer pixel m0, may be simultaneously read out and supplied to the adder 6. The adder 6 obtains the sum of pixels h00, h10, and h01 and supplies the sum value to the adder-subtracter 10. Simultaneously, the second-layer pixel m0 formed by using final input pixel h11 may be read out from the second-layer memory 2 and supplied to the adder-subtracter 10. In the adder-subtracter 10, the subtracter 10B subtracts the sum value received from the adder 6 from pixel m0 so as to obtain the final input pixel h11 (h11=m0−(h00+h10+h01)) which may be output.

The reading out the other final input pixels h31, h13, and h33 may be obtained in a similar manner and outputted.

With regard to the reading out of the final input pixel h33 of the first layer, the final input pixel m3 of the second layer is utilized in obtaining the pixel h33. The pixel m3 may be obtained in the above-described manner.

As described above, pixels may be read out from the first-layer memory 1 and the second-layer memory 2 for storing pixels of lower layers such that the three pixels for forming a pixel of the upper layer in the 2×2 pixels of the lower layer, excluding the final input pixel, are read out as a unit. As such, the first-layer memory 1 and the second-layer memory 2 may perform a function similar to that of a delay circuit (such as one externally connected as in the above arrangement described with reference to FIG. 16). Thus, in the present embodiment, the image corresponding to each layer can be written (hierarchically coded) and the written image corresponding to each layer can be read out (decoded) without a delay circuit. As a result, the size of the present apparatus may be reduced and the processing speed may be increased as compared to that of other apparatus such as that described with reference to FIG. 16.

In the embodiment shown in FIG. 1, a 3-input adder and an adder-subtracter capable of selectively performing addition or subtraction may be utilized for calculating a pixel of an upper layer at the time of writing and for obtaining a final input pixel at the time of reading. Since the 3-input adder can be used in common for writing and reading operations, the storage apparatus can be realized by using a relatively simple hardware arrangement.

Figure 2:
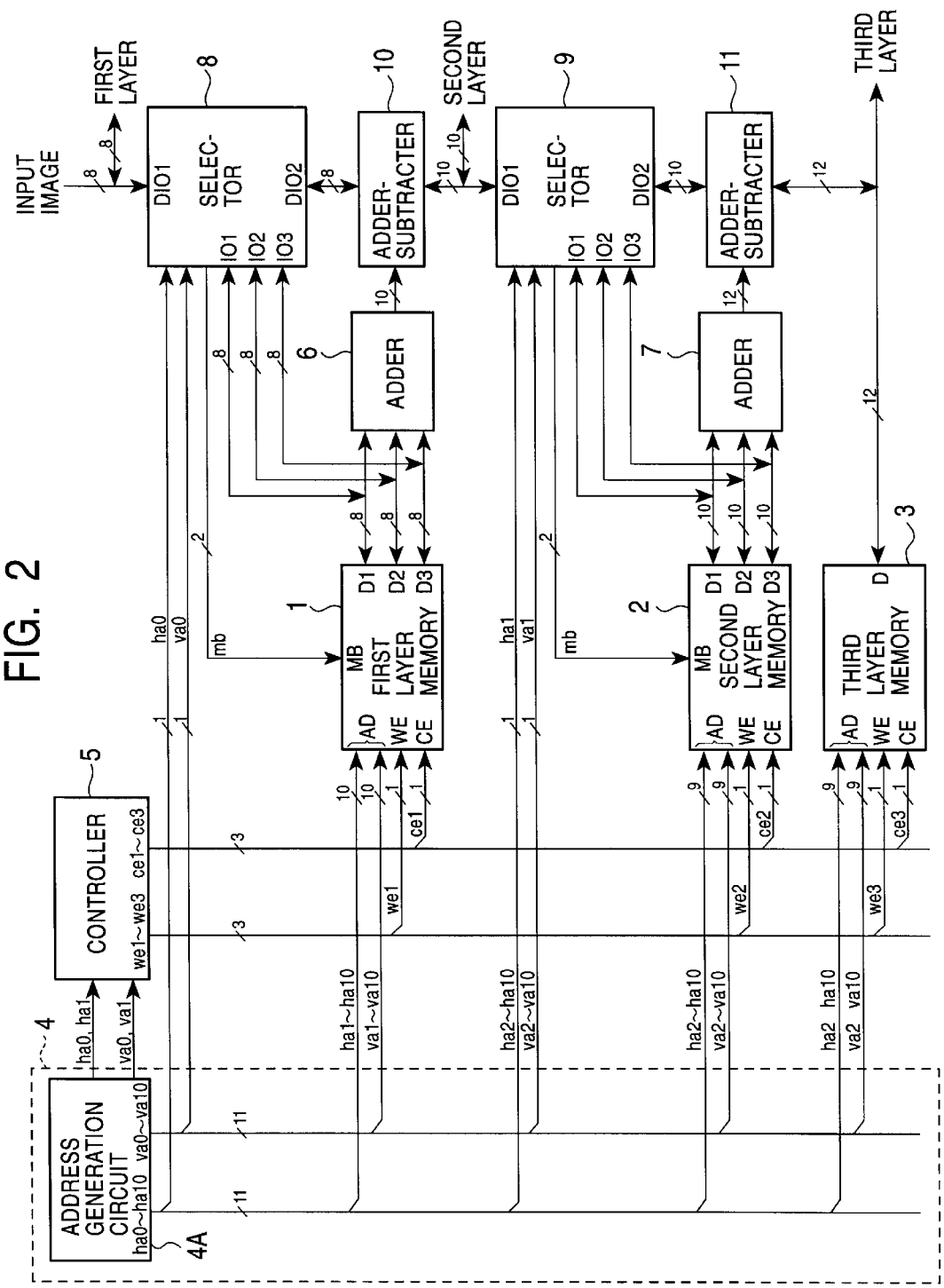
FIG. 2 is a diagram of the storage apparatus of FIG. 1.

FIG. 2 illustrates the storage apparatus of FIG. 1 in more detail.

The first-layer memory 1 is arranged to store, with an address designated by an address supply circuit 4, first-layer pixels (the pixel values of pixels forming an image corresponding to a first layer) supplied from a selector 8, to read out the first-layer pixels stored with the address, and to output the read pixels to the adder 6 and to the selector 8. That is, the first-layer memory 1 is arranged to store first-layer pixels supplied from the selector 8 to its data terminals D1 to D3 with an address supplied from the address supply circuit 4 to its address terminals AD. The first-layer memory 1 is also arranged to read out first-layer pixels stored with an address supplied from the address supply circuit 4 to its address terminals AD, and to output the read pixels from its data terminals D1 to D3 to the adder 6 and to the selector 8.

Figure 3:
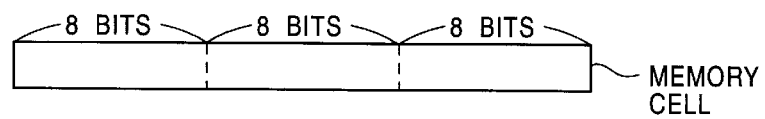
FIG. 3 is a diagram of a memory cell of a first-layer memory of the apparatus of FIG. 1.

The first-layer memory 1 is arranged to store unit pixel groups each having three pixels supplied from the selector 8 (the pixel values of pixels forming a first layer image) with an address designated by the address supply circuit 4 (in a memory cell with the address), to read out the unit group of three pixels of the first-layer image stored with the address, and to output the read pixels to the adder 6 and to the selector 8. That is, as an example, a memory cell corresponding to one address in the first-layer memory 1 can store a number of bits three times larger than the number of bits assigned to the first-layer pixels. More specifically, if, for example, each of the first-layer pixels is represented by eight bits, a memory cell of the first-layer memory 1 is formed so as to be capable of storing data of 24 (8×3) bits, as shown in FIG. 3. Thus, in the first-layer memory 1, reading or writing of a unit group of 24 bits for the first-layer pixels, that is, a unit group of 3 pixels, may be performed when one address is designated.

As such, in the first-layer memory 1, three pixels of the first layer read and written with respect to one address may be respectively input and output through the data terminals D1 to D3 of the first-layer memory 1.

Alternatively, reading or writing of each unit group of three pixels may be performed in the situation wherein the first-layer memory 1 is formed so as to be capable of storing 8-bit data in one memory cell and one address is related to three memory cells.

A 1-bit write enable signal we1 may be supplied from a controller 5 to a write enable terminal WE of the first-layer memory 1. In the first-layer memory 1, writing may be performed with an address supplied from the address supply circuit 4 when the write enable signal we1 is a relatively high level, and reading from an address supplied from the address supply circuit 4 may be performed when the write enable signal we1 is a relatively low level.

Further, a 1-bit chip enable signal ce1 may be supplied from the controller 5 to a chip enable terminal CE of the first-layer memory 1. In the first-layer memory 1, reading or writing of data (the pixel value of each first-layer pixel) may be performed only when the chip enable signal ce1 is a relatively high level.

Therefore, in the first-layer memory 1, data writing with an address supplied from the address supply circuit 4 may be performed when the chip enable signal ce1 and the write enable signal we1 are high levels, and reading of data from an address supplied from the address supply circuit 4 may be performed when the write enable signal we1 is a low level. Neither data reading nor writing may be performed in the first-layer memory 1 when the chip enable signal ce1 is a low level.

Figure 4:
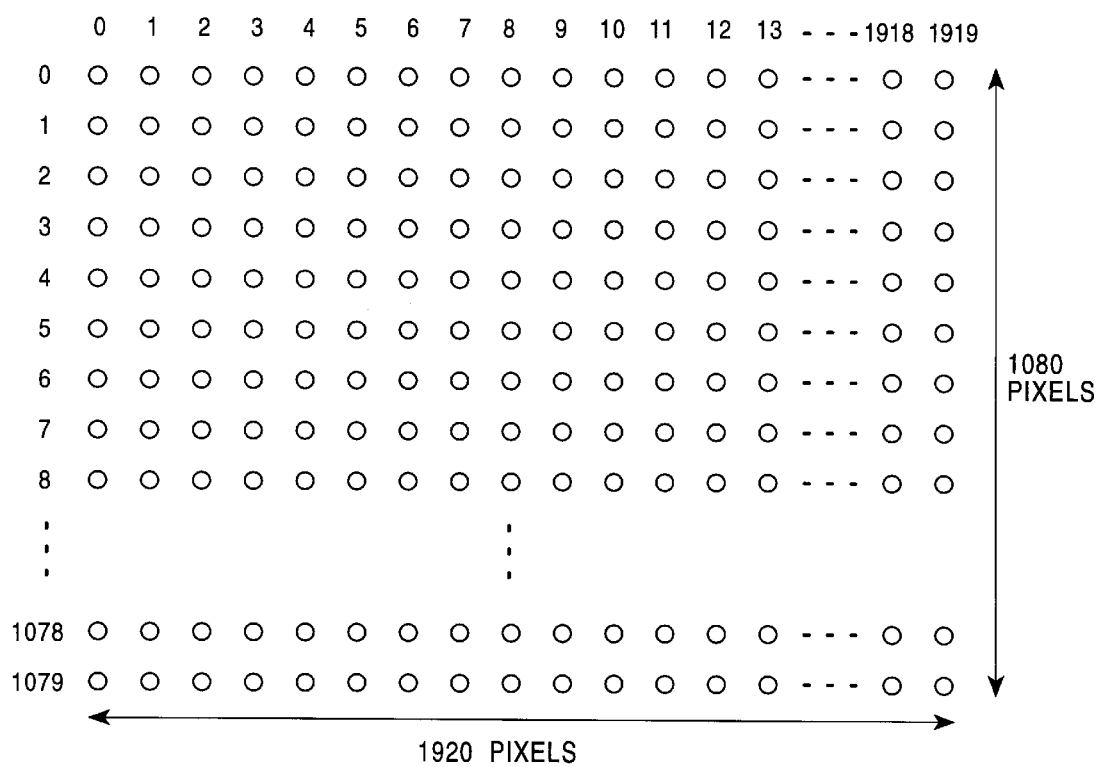
FIG. 4 is a diagram to which reference will be made in explaining a configuration of an image input to the storage apparatus of FIG. 2.

The first-layer memory 1 may be formed so as to be capable of storing at least an amount of data corresponding to ¾ of one frame of a first-layer image. Accordingly, if an image having one frame formed of, for example, 1920 pixels in the horizontal direction×1080 pixels in the vertical direction, as shown in FIG. 4, is input as a first-layer image to the storage apparatus, and if eight bits are assigned to one pixel, the first-layer memory 1 may have a storage capacity of 1920 pixels×1080 pixels×8 bits×¾ bits or about 12 megabits. The reason why the first-layer memory 1 may have a storage capacity smaller than the amount of data forming one frame of a first-layer image (i.e., a storage capacity corresponding to ¾ of one frame of data) is that, in this embodiment, the final input pixel(s) in the first-layer 2×2 pixels is not stored, as described above. The same can be said with respect to the second-layer memory 2 described below.

A mask bit mb may be supplied from the selector 8 to a mask bit terminal MB of the first-layer memory 1, as described below.

The second-layer memory 2 may be arranged in a manner similar to that of the first-layer memory 1 to store unit pixel groups each having three second-layer pixels supplied from a selector 9 (the pixel values of pixels forming a second-layer image) with an address designated by the address supply circuit 4, to read out the unit group of three second-layer pixels stored with the address, and to output the read pixels to the adder 7 and the selector 9. That is, an address may be supplied from the address supply circuit 4 to address terminals AD of the second-layer memory 2. Further, a 1-bit write enable signal we2 and/or a chip enable signal ce2 from the controller 5 may be supplied to a write enable terminal WE and/or a chip enable terminal CE of the second-layer memory 2.

In the second-layer memory 2, data consisting of a unit group of three pixels may be written with an address supplied from the address supply circuit 4 when the chip enable signal ce2 and the write enable signal we2 are high levels, and data consisting of a unit group of three pixels may be read out from an address supplied from the address supply circuit 4 when the write enable signal we2 is a low level. Three pixels read or written at a time may be respectively input or output through the data terminals D1 to D3 of the second-layer memory 2.

A mask bit mb may also be supplied from the selector 9 to a mask bit terminal MB of the second-layer memory 2, in a manner similar to that of the first-layer memory 1.

The second-layer memory 2 may be formed so as to be capable of storing at least an amount of data corresponding to ¾ of one frame of a second-layer image. That is, in this embodiment, one second-layer pixel may be represented by ten bits since it is obtained as the sum of the values of four pixels in the first-layer pixels each represented by eight bits. Further, since one second-layer pixel is obtained from first-layer 2×2 pixels, each of the numbers of pixels in the horizontal and vertical directions of the second-layer image is ½ that of the first-layer image. Therefore, the second-layer memory 2 may have a storage capacity of 1920 pixels×½× 1080 pixels×½×10 bits×¾ bits or about 3.7 megabits.

The third-layer memory 3 may be arranged to store, as one unit, one third-layer pixel supplied from the adder-subtracter 11 (the pixel value of a pixel forming a third-layer image) with an address designated by the address supply circuit 4, to read out one unit third-layer pixel stored with the address, and to output the read pixel to the adder-subtracter 11. That is, an address may be supplied from the address supply circuit 4 to address terminals AD of the third-layer memory 3. Further, a 1-bit write enable signal we3 and/or a chip enable signal ce3 from the controller 5 may be supplied to a write enable terminal WE and/or a chip enable terminal CE of the third-layer memory 3.

In the third-layer memory 3, data of one unit pixel may be written with an address supplied from the address supply circuit 4 when chip enable signal ce3 and write enable signal we3 are high levels, and data of one unit pixel may be read out from an address supplied from the address supply circuit 4 when write enable signal we3 is a low level. Data read or written in the third-layer memory 3 (the pixel value of a third-layer pixel) may be input or output through a data terminal D of the third-layer memory 3.

The third-layer memory 3 may be formed so as to be capable of storing at least an amount of data corresponding to ¾ of one frame of a third-layer image. That is, in this embodiment, one third-layer pixel may be represented by twelve bits since it is obtained as the sum of the values of four pixels in the second-layer pixels which are each represented by ten bits. Since one third-layer pixel may be obtained from second-layer 2×2 pixels, each of the numbers of pixels in the horizontal and vertical directions of the third-layer image is ½ that of the second-layer image, or ¼ that of the first-layer image. Therefore, the third-layer memory 3 may have a storage capacity of 1920 pixels×¼× 1080 pixels×¼×12 bits×¾ bits or about 1.1 megabits.

The address supply circuit 4 may have an address generation circuit 4A which generates a horizontal address and a vertical address respectively corresponding to the positions in the horizontal and vertical directions of each of the pixels forming an image input to the storage apparatus. The address supply circuit 4 may form the desired addresses of the horizontal and vertical addresses output from the address generation circuit 4A, and may supply the formed addresses to the first-layer memory 1, the second-layer memory 2, and the third-layer memory 3. That is, the address supply circuit 4 may form and supply horizontal and vertical addresses to the first-layer memory 1 or the second-layer memory 2 such that unit groups of three pixels in first- or second-layer pixels are read from or written to the first-layer memory 1 or the second-layer memory; and the address supply circuit 4 may form and supply horizontal and vertical addresses to the third-layer memory 3 such that each of the third-layer pixels is read from or written to the third-layer memory 3 as a unit.

The address supply circuit 4 may also supply a least significant bit or bits of the horizontal and vertical addresses as a control signal to the controller 5 and the selectors 8 and 9.

In this embodiment, as shown in FIG. 4, an image having one frame formed of 1920 pixels in the horizontal direction and 1080 lines arranged in the vertical direction (digital image data) may be input. Since each of the minimum of integers equal to or larger than log2 1920 and the minimum of integers equal to or larger than log2 1080 is 11, each of the horizontal and vertical addresses output from the address generation circuit 4A may be represented by at least eleven bits.

The address generation circuit 4A may also be arranged to generate horizontal and vertical addresses in accordance with clock timing or timings in synchronization with pixels forming an image input to the storage apparatus.

The adder 6 may be a 3-input adder arranged to compute the sum of the values of three 8-bit first-layer pixels simultaneously output from the data terminals D1 to D3 of the first-layer memory 1 and to output the sum value to the adder-subtracter 10. Also, the adder 7 may be a 3-input adder arranged to compute the sum of the values of three 10-bit second-layer pixels simultaneously output from the data terminals D1 to D3 of the second-layer memory 2 and to output the sum value to the adder-subtracter 11.

An image input to the storage apparatus may be supplied to an input/output terminal DIO1 of the selector 8. Pixels as an object to be hierarchically coded, for example, pixels forming a progressive image, which are input in line scanning order (input by being successively scanned) may be supplied to the storage apparatus. Pixels of an image thus input in line scanning order may be supplied to the selector 8.

The selector 8 may be arranged to supply, from one of input/output terminals DIO1 to IO3 to the corresponding one of the data terminals D1 to D3 of the first-layer memory 1, each of the pixels of a hierarchical coding object image supplied to its input/output terminal DIO1, the pixel being supplied as a first-layer pixel. That is, in the embodiment shown in FIG. 2, the input/output terminals IO1 to IO3 of the selector 8 may be respectively connected to data terminals D1 to D3 of the first-layer memory 1 so as to enable pixels output from the input/output terminals IO1 to IO3 of the selector 8 to be respectively supplied to the data terminals D1 to D3 of the first-layer memory 1. In some situations, the selector 8 may output pixels of a hierarchical coding object image to the adder-subtracter 10 through input/output terminal DIO2 without outputting them from any of input/output terminals IO1 to IO3, as described below.

Three first-layer pixels output from the data terminals D1 to D3 of the first-layer memory 1 may be respectively supplied to the input/output terminals IO1 to IO3 of the selector 8. The selector 8 may select one of the three received pixels based on a control signal (least significant bit or bits of a horizontal address and a vertical address as mentioned above) supplied from the address supply circuit 4, and may output the selected pixel as a first-layer pixel from its input/output terminal DIO1. In some situations, the selector 8 may select an output of the adder-subtracter 10 supplied to its input/output terminal DIO2 and output it as a first-layer pixel from its input/output terminal DIO1 without selecting any of the three pixels supplied to its input/output terminals IO1 to IO3, as described below.

Further, the selector 8 may supply mask bit signal mb to the mask bit terminal MB of the first-layer memory 1.

The selector 9 may be arranged to supply from one of its input/output terminals IO1 to IO3 to the corresponding one of the data terminals D1 to D3 of the second-layer memory 2 an output from the adder-subtracter 10 supplied to its input/output terminal DIO1, in which the output from the adder-subtracter 10 is supplied as a second-layer pixel. That is, in the embodiment shown in FIG. 2, the input/output terminals IO1 to IO3 of the selector 9 are respectively connected to the data terminals D1 to D3 of the second-layer memory 2 so as to enable pixels output from the input/output terminals IO1 to IO3 of the selector 9 to be respectively supplied to the data terminals D1 to D3 of the second-layer memory 2. In some situations, the selector 9 may supply an output of the adder-subtracter 10 to the adder-subtracter 11 through its input/output terminal DIO2 without outputting it from any of its input/output terminals IO1 to IO3, as described below.

Three second-layer pixels output from the data terminals D1 to D3 of the second-layer memory 2 may be respectively supplied to the input/output terminals IO1 to IO3 of the selector 9. The selector 9 may select one of the three pixels based on a control signal (least significant bit or bits of a horizontal address and a vertical address as mentioned above) supplied from the address supply circuit 4, and may output the selected pixel as a second-layer pixel from its input/output terminal DIO1. In some situations, the selector 9 may select an output of the adder-subtracter 11 supplied to its input/output terminal DIO2 and output it as a second-layer pixel from its input/output terminal DIO1 without selecting any of three pixels supplied to its input/output terminals IO1 to IO3, as described below.

Further, the selector 9 may supply mask bit signal mb to the mask bit terminal MB of the second-layer memory 2.

The adder-subtracter 10 may be arranged to compute the sum of an output of the adder 6 and an output from the input/output terminal DIO2 of the selector 8 and to supply the sum value as a second-layer pixel to the input/output terminal DIO1 of the selector 9. The adder-subtracter 10 may also be arranged to subtract an output of the adder 6 from an output of the input/output terminal DIO1 of the selector 9 and to supply the subtraction result as a first-layer pixel to the input/output terminal DIO2 of the selector 8.

The adder-subtracter 11 may be arranged to compute the sum of an output of the adder 7 and an output from the input/output terminal DIO2 of the selector 9 and to supply the sum value as a third-layer pixel to the data terminal D of the third-layer memory 3. The adder-subtracter 11 may also be arranged to subtract an output of the adder 7 from a third-layer pixel supplied from the data terminal D of the third-layer memory 3 and to supply the subtraction result as a second-layer pixel to the input/output terminal DIO2 of the selector 9.

An operation of the present apparatus will now be described.

For this discussion, it is assumed that, as already described with reference to FIG. 4, a progressive image having one frame formed of 1920×1080 pixels each represented by eight bits is supplied as a first-layer image to the storage apparatus. Further, with regard to the pixels forming a first-layer image, the upper leftmost pixel is represented by h(0,0) and the pixel at the (x+1)th position from the left and the (y+1)th position from the top is represented by h(x, y). In this embodiment, since a first-layer image is formed of 1920×1080 pixels as mentioned above, each of x and y has an integer value in the range of 0 to 1919 or 0 to 1079.

Let s and t be variables having an integer value in the range of 0 to 959 (=1920/2−1) and an integer value in the range of 0 to 539 (=1080/2−1), respectively. Then, a pixel constituting a second-layer image may be represented by the sum of adjacent first-layer 2×2 pixels:

h(2s, 2t), h(2s+1, 2t), h(2s, 2t+1), h(2s+1, 2t+1).

These pixels may be expressed as m(s, t) as follows:

$$m(s, t)=h(2s, 2t)+h(2s+1, 2t)+h(2s, 2t+1)+h(2s+1, 2t+1) \quad (1)$$

Let m and n be variables having an integer value in the range of 0 to 479 (=1920/4−1) and an integer value in the range of 0 to 269 (=1080/4−1), respectively. Then, a pixel constituting a third-layer image may be represented by the sum of adjacent second-layer 2×2 pixels:

m(2m, 2n), m(2m+1, 2n), m(2m, 2n+1), m(2m+1, 2n+1), which is the sum of the adjacent first-layer 4×4 pixels:

h(4m, 4n), h(4m+1, 4n), h(4m+2, 4n), h(4m+3, 4n), h(4m, 4n+1), h(4m+1, 4n+1), h(4m+2, 4n+1), h(4m+3, 4n+1), h(4m, 4n+2), h(4m+1, 4n+2), h(4m+2, 4n+2), h(4m+3, 4n+2), h(4m, 4n+3), h(4m+1, 4n+3), h(4m+2, 4n+3), h(4m+3, 4n+3).

These pixels may be expressed as an equation q(m, n) as follows:

$$q(m, n)=m(2m, 2n)+m(2m+1, 2n)+m(2m, 2n+1)+m(2m+1, 2n+1)=)$$

$$h(4m, 4n)+h(4m+1, 4n)+h(4m+2, 4n)+h(4m+3, 4n)+h(4m, 4n+1)+h(4m+1, 4n+1)+h(4m+2, 4n+1)+h(4m+3, 4n+1)+h(4m, 4n+2)+h(4m+1, 4n+2)+h(4m+2, 4n+2)+h(4m+3, 4n+2)+h(4m, 4n+3)+$$

$$h(4m+1, 4n+3)+h(4m+2, 4n+3)+h(4m+3, 4n+3).$$

It is also assumed that during data writing and reading the address generation circuit 4A may supply combinations (HA, VA) of horizontal address HA and vertical address VA in the order of:

(0, 0), (1, 0), . . . , (1919, 0), (0, 1), (1, 1), . . . , (1919, 1)

.

.

.

(0, 1079), (1, 1079), . . . , (1919, 1079)

(in the order corresponding to the progressive scan order) in synchronization with the clock, and that, during writing (during hierarchical coding), pixels at the positions corresponding to horizontal address HA and vertical address VA may be supplied to the input/output terminal DIO1 of the selector 8.

Further, each of horizontal address HA and vertical address VA may be designated by eleven bits, as mentioned above, and the bits for the horizontal address HA may be represented by ha0 (which is the least significant bit), ha1, ha2, . . . , ha10 (wherein ha10 is the most significant bit). Similarly, the bits for the horizontal address VA may be represented by va0 (which is the least significant bit), va1, va2, . . . , va10 (wherein va10 is the most significant bit). As a result, the address circuit 4 may supply bits ha0 and ha1 and bits va0 and va1 as a control signal to the controller 5, bits ha0 and va0 as a control signal to the selector 8, and bits ha1 and va1 as a control signal to the selector 9.

In this situation, first-layer, second-layer and third-layer pixels are written to the first-layer memory 1, the second-layer memory 2 and the third-layer memory 3 respectively as described below.

First, with respect to the first-layer memory 1, the controller 5 sets each of write enable signal we1 and chip enable signal ce1 to a high level and supplies such high-level signals we1 and ce1 to the first-layer memory 1. The address supply circuit 4 supplies to the address terminals AD of the first-layer memory 1 the upper ten bits ha1 to ha10 (excluding the least significant bit ha0) which are part of the horizontal address HA output by the address generation circuit 4A, and the upper ten bits va1 to va10 (excluding the least significant bit va0) which are part of the vertical address VA. Further, the address supply circuit 4 outputs the least significant bit ha0 of the horizontal address HA and the least significant bit va0 of the vertical address VA as a control signal to the selector 8.

Accordingly, at the time of inputting to the input/output terminal DIO1 of the selector 8 each of the 2×2 four first-layer pixels h(2s, 2t), h(2s+1, 2t), h(2s, 2t+1), and h(2s+1, 2t+1) used to obtain second-layer pixel m(s, t), the address supply circuit 4 outputs a signal designating the same address (s, t) in the first-layer memory 1 to the first-layer memory 1. The selector 8 outputs, from one of its input/output terminals IO1 to IO3, and DIO2, a first-layer pixel supplied to its input/output terminal DIO1 based on control signals ha0 and va0 from the address supply circuit 4. That is, when each of the control signals ha0 and va0 is 0, i. e., when the first-layer image h(2s, 2t) is input to the input/output terminal DIO1 of the selector 8, the selector 8 outputs the pixel h(2s, 2t) from the input/output terminal IO1. When the control signals ha0 and va0 are 1 and 0, respectively, i.e., when the first-layer image h(2s+1, 2t) is input to the input/output terminal DIO1, the selector 8 outputs the pixel h(2s+1, 2t) from the input/output terminal IO2. When the control signals ha0 and va0 are 0 and 1, respectively, i.e., when first-layer image h(2s, 2t+1) is input to the input/output terminal DIO1, the selector 8 outputs the pixel h(2s, 2t+1) from the input/output terminal IO3. When each of control signals ha0 and va0 is 1, i.e., when first-layer image h(2s+1, 2t+1) is input to the input/output terminal DIO1, the selector 8 outputs the pixel h(2s+1, 2t+1) from the input/output terminal DIO2.

Figure 5:
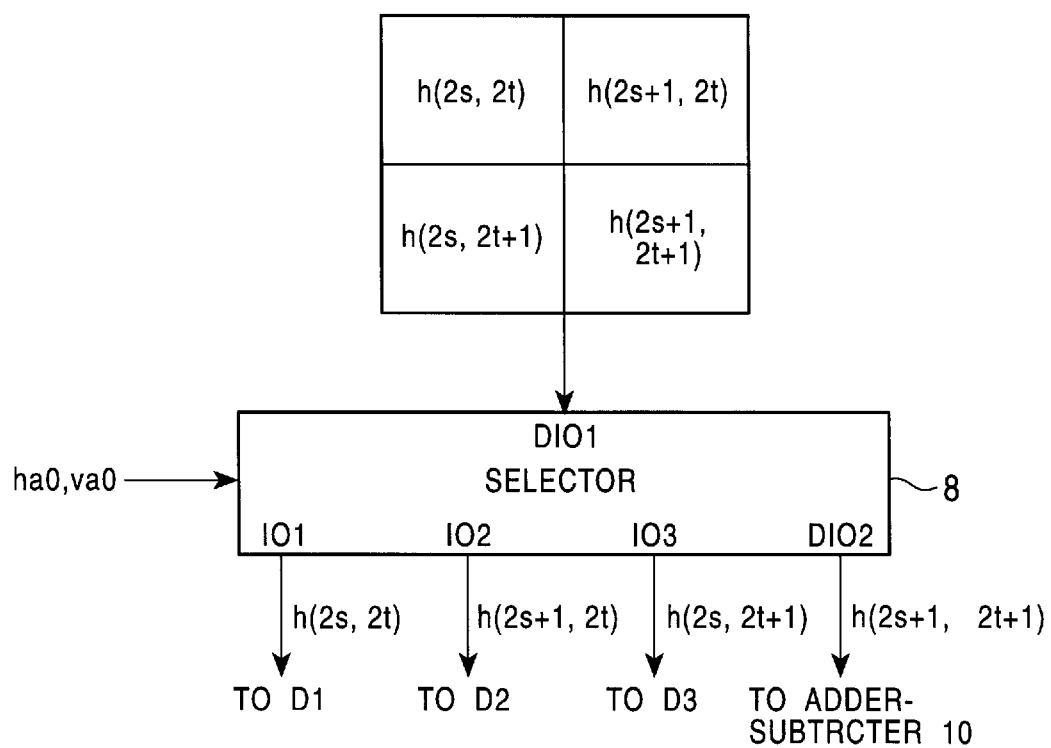
FIG. 5 is a diagram to which reference will be made in explaining processing performed by a selector of the apparatus of FIG. 2.

Thus, as shown in FIG. 5, the selector 8 outputs first-layer pixel h(2s, 2t), h(2s+1, 2t), h(2s, 2t+1), or h(2s+1, 2t+1) from its input/output terminal IO1, IO2, IO3, or DIO2 to the data terminal D1, D2, or D3 of the first-layer memory 1 or to the adder-subtracter 10.

In the first-layer memory 1, data supplied to the data terminals D1 to D3 is stored with address (s, t).

In the first-layer memory 1 (also in the second-layer memory 2), as shown in FIG. 3, a memory cell with an address (s, t) is formed so as to be capable of storing data corresponding to three first-layer pixels. In this embodiment, in such a memory cell, pixels h(2s, 2t), h(2s+1, 2t), and h(2s, 2t+1) are stored as a first group of eight bits, a second group of eight bits, and a third group of eight bits arranged from left to right as viewed in FIG. 3. That is, in a memory cell of the first-layer memory 1 in this embodiment, inputs from the data terminals D1 to D3 of the first-layer memory 1 may be simultaneously stored as a first group of eight bits, a second group of eight bits, and a third group of eight bits arranged from left to right.

However, pixels h(2s, 2t), h(2s+1, 2t), and h(2s, 2t+1) are supplied to the data terminals D1 to D3 of the first-layer memory 1 at different times corresponding to the times of outputting (2s, 2t), (2s+1, 2t), or (2s, 2t+1) as combinations (HA, VA) of horizontal address HA and vertical address VA by the address generation circuit 4A. These output timings may not be consistent. In the selector 8, at the time when pixel h(2s, 2t) is output from the input/output terminal IO1, outputs from the other input/output terminals IO2 and IO3 are not fixed. Similarly, at the time when pixel h(2s+1, 2t) is output from the input/output terminal IO2 or at the time when pixel h(2s, 2t+1) is output from the input/output terminal IO3, outputs from the other input/output terminals IO1 and IO3, or IO1 IO2 may not be fixed.

Consider a situation in which, at the time of outputting, for example, (2s, 2t) as a combination (HA, VA) of horizontal address HA and vertical address VA, pixel h(2s, 2t) is written as a leftmost group of eight bits in a memory cell of the first-layer memory 1, and (2s+1, 2t) is thereafter output as another combination (HA, VA) of horizontal address HA and vertical address VA. At this time, pixel h(2s+1, 2t) is written as a group of eight bits next to the leftmost group of eight bits. In such a situation, however, an unfixed output from the input/output terminal IO1 of the selector 8 can be overwritten as a leftmost group of eight bits in the memory cell of the first-layer memory 1, although pixel h(2s, 2t) has been written as such bits. The selector 8 then generates, based on control signals ha0 and va0 from the address supply circuit 4, mask bit signal mb for controlling writing of each bit to a memory cell of the first-layer memory 1, and supplies the mask bit signal mb to the mask bit terminal MB of the first-layer memory 1.

Figure 6A:
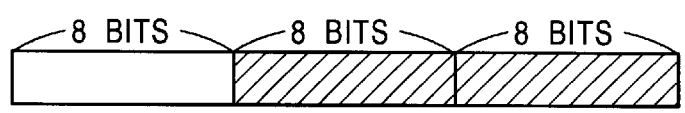
FIGS. 6A, 6B, and 6C are diagrams to which reference will be made in explaining the use of a mask bit signal.
Figure 6B:
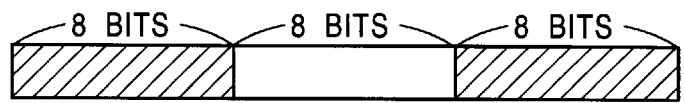
Figure 6C:
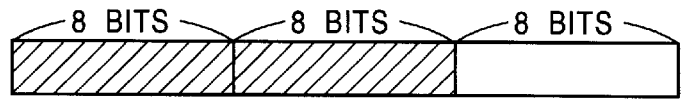

As such, when each of control signals ha0 and va0 is 0, i.e., when pixel h(2s, 2t) is output from the input/output terminal IO1 of the selector 8 to the data terminal D1 of the first-layer memory 1, the selector 8 supplies the first-layer memory 1 with mask bit signal mb for masking the group of eight bits next to the first group of eight bits and the final group of eight bits (for inhibiting writing of these bits) in the memory cell with address (s, t), as shown in FIG. 6(A). When the control signals ha0 and va0 are 1 and 0, respectively, i.e., when pixel h(2s+1, 2t) is output from the input/output terminal IO2 of the selector 8 to the data terminal D2 of the first-layer memory 1, the selector 8 supplies the first-layer memory 1 with mask bit signal mb for masking the first group of eight bits and the final group of eight bits in the memory cell with address (s, t), as shown in FIG. 6(B). When the control signals ha0 and va0 are 0 and 1, respectively, i.e., when pixel h(2s, 2t+1) is output from the input/output terminal IO3 of the selector 8 to the data terminal D3 of the first-layer memory 1, the selector 8 supplies the first-layer memory 1 with mask bit signal mb for masking the first group of eight bits and the next group of eight bits in the memory cell with address (s, t), as shown in FIG. 6(C).

Figure 7:
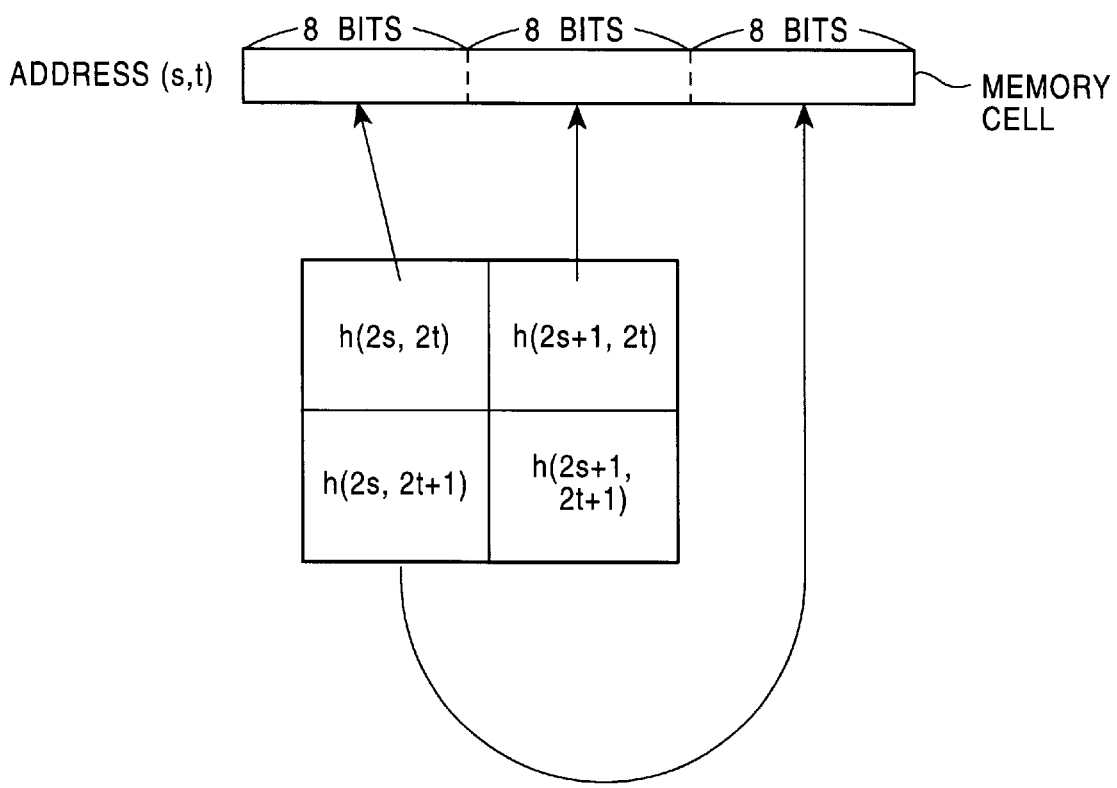
FIG. 7 is a diagram to which reference will be made in explaining a stored state of first-layer pixels in a memory cell of the first-layer memory.

As a result, in the first-layer memory 1, at the time of being supplied with pixel h(2s, 2t), h(2s+1, 2t), or h(2s, 2t+1), only pixel h(2s, 2t), h(2s+1, 2t), or h(2s, 2t+1) is written as a first, second or final group of eight bits in the memory cell with address (s, t), as shown in FIG. 7.

Since the mask bit signal mb provides an indication for allowing writing in one of three areas (first, second, and final groups of eight bits) in a memory cell, the mask bit signal mb should have at least two bits.

As described above and as shown in FIG. 8, of the 2×2 four first-layer pixels h(2s, 2t), h(2s+1, 2t), h(2s, 2t+1), and h(2s+1, 2t+1) used to obtain the second-layer pixel m(s, t), only three pixels h(2s, 2t), h(2s+1, 2t), and h(2s, 2t+1) are written to the first-layer memory 1. (In this situation, the final input pixel h(2s+1, 2t+1) may be excluded or not written to the first-layer memory 1.) As is to be appreciated, such arrangement may apply to each of the 2×2 first-layer pixel groups.

When each of control signals ha0 and va0 is 1, the first-layer pixel h(2s+1, 2t+1) is output from the selector 8 to the adder-subtracter 10, as described above. In this situation, the controller 5 sets the write enable signal we1 to a low level. That is, when each of control signals ha0 and va0 supplied from the address supply circuit 4 is 1, the controller 5 changes the write enable signal we1 from a high level to a low level and supplies such low-level write enable signal we1 to the first-layer memory 1.

Figures 8, 9:
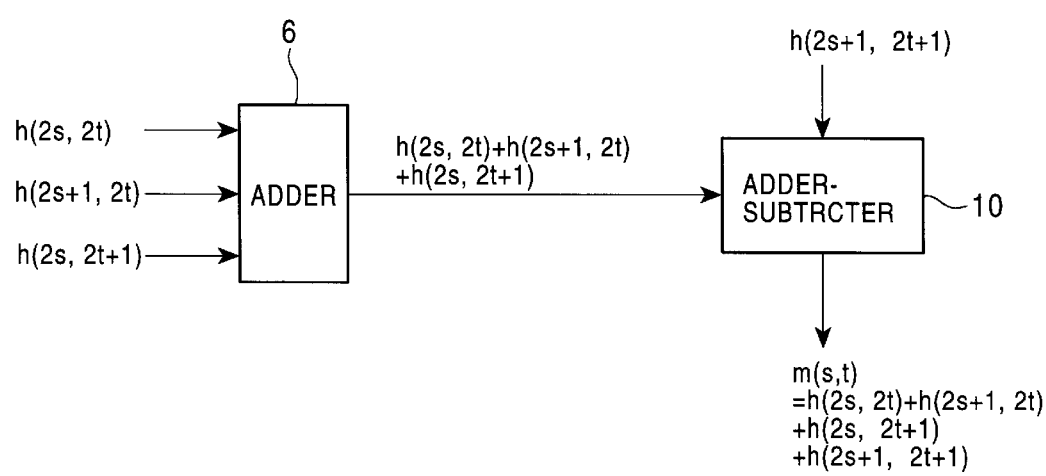
FIG. 8 is a diagram illustrating first-layer pixels written to the first-layer memory.
FIG. 9 is a diagram to which reference will be made in explaining processing performed by an adder and an adder-subtracter of the apparatus of FIG. 2.

Therefore, when the address generation circuit 4A outputs address (2s+1, 2t+1), the first-layer memory 1 is in a reading state and data stored with address (s, t) from the address supply circuit 4 (i.e., three first-layer pixels h(2s, 2t), h(2s+1, 2t), and h(2s, 2t+1) which are already stored) may be simultaneously read out. These three pixels h(2s, 2t), h(2s+1, 2t), and h(2s, 2t+1) are respectively output from data terminals D1 to D3 of the first-layer memory 1 and supplied to the adder 6, as shown in FIG. 9. The adder 6 computes the sum of the three pixels h(2s, 2t), h(2s+1, 2t), and h(2s, 2t+1) received from the first-layer memory 1, and supplies the obtained sum value to the adder-subtracter 10. The adder-subtracter 10 computes the sum of the sum value from the adder 6 and pixel h(2s+1, 2t+1) from the selector 8 to obtain second-layer pixel m(s, t) (=h(2s, 2t)+h(2s+1, 2t)+h(2s, 2t+1)+h(2s+1, 2t+1). Such pixel m(s, t) is output from the adder-subtracter 10 to the input/output terminal DIO1 of the selector 9.

Figure 10:
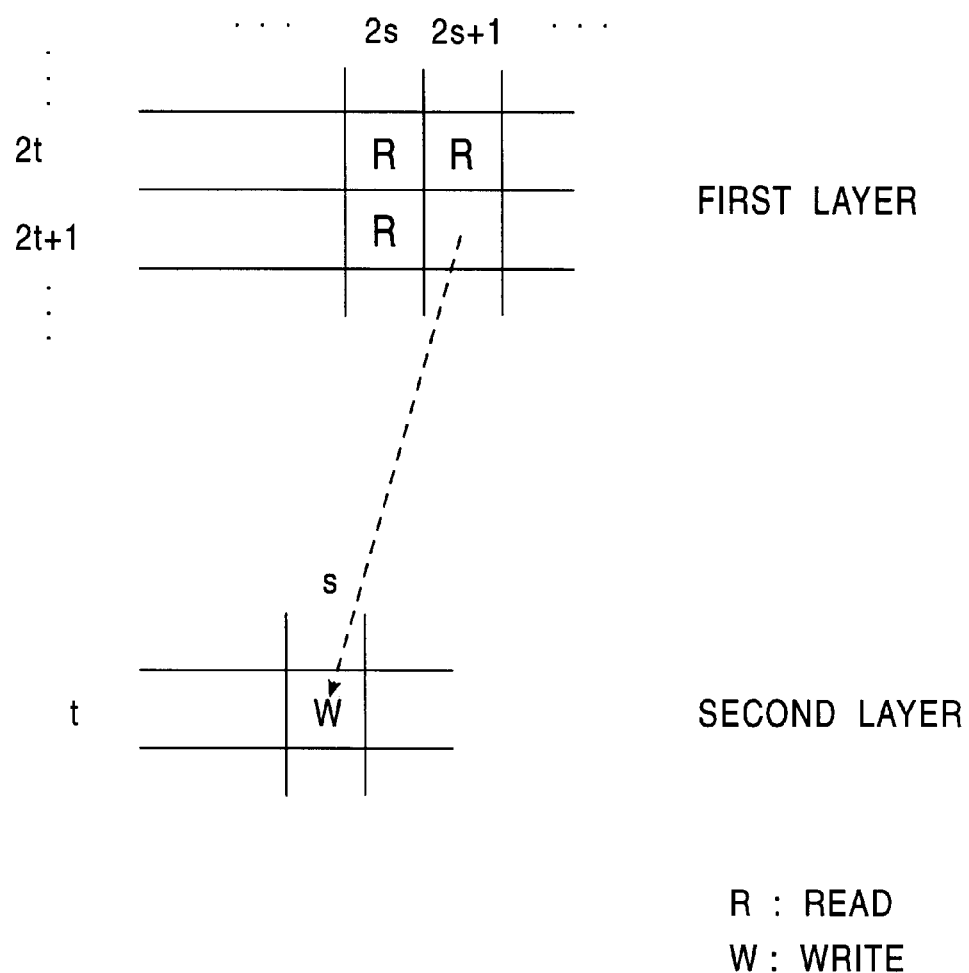
FIG. 10 is a diagram to which reference will be made in explaining the formation a second-layer pixel.
Figure 11:
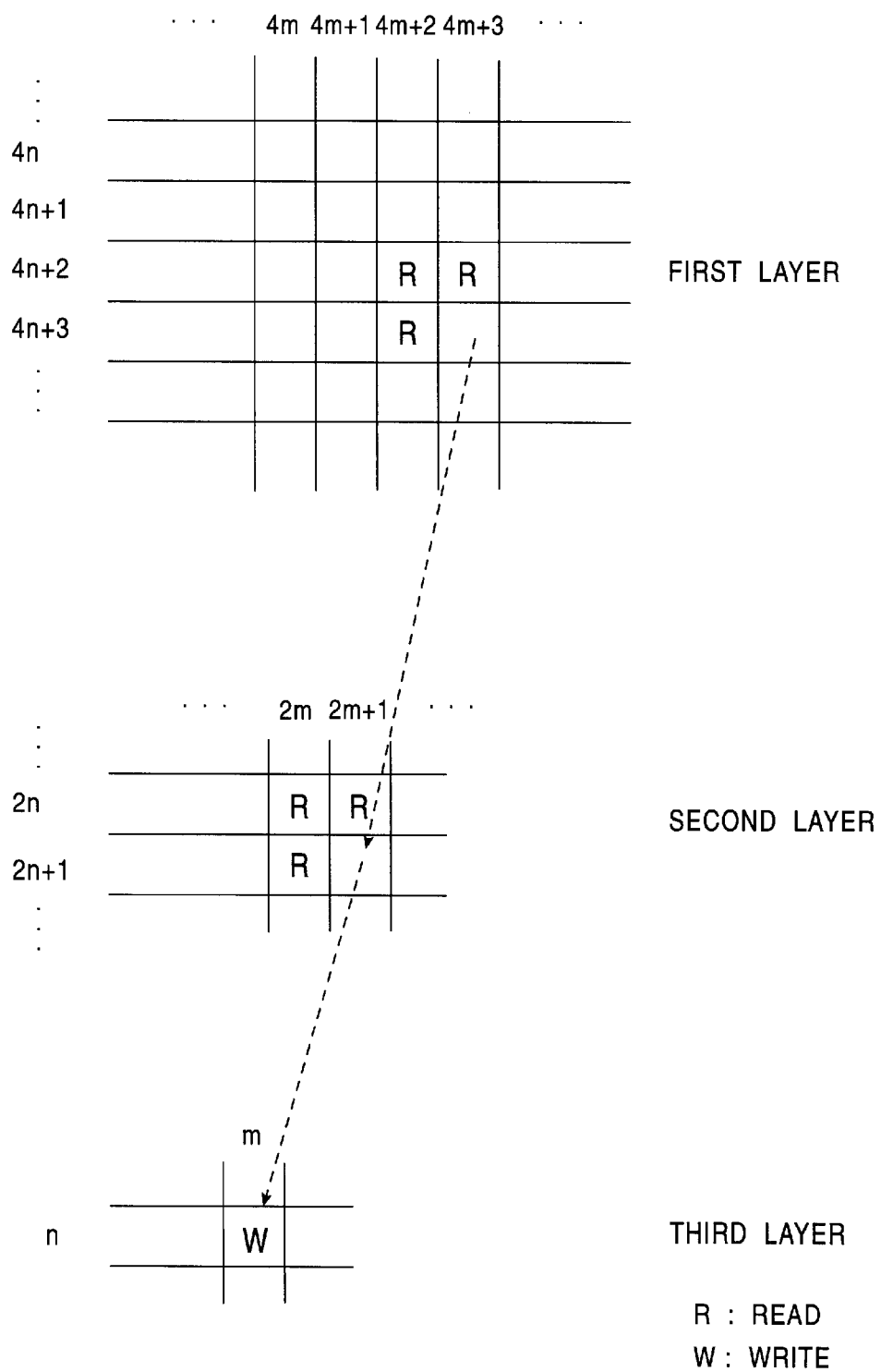
FIG. 11 is a diagram to which reference will be made in explaining the formation of a third-layer pixel.

Thus, at the time of being supplied with the final input pixel h(2s+1, 2t+1) of the four first-layer 2×2 pixels h(2s, 2t), h(2s+1, 2t), h(2s, 2t+1), and h(2s+1, 2t+1) used to obtain the second layer pixel m(s, t), three first-layer pixels h(2s, 2t), h(2s+1, 2t), and h(2s, 2t+1) stored with address (s, t) in the first-layer memory 1 are read out, as shown in FIG. 10. Such three pixels and the final input pixel h(2s+1, 2t+1) may be used to obtain the second-layer pixel m(s, t) which is written to the second-layer memory 2, as described below.

The second layer pixel m(s, t) may be supplied from the adder-subtracter 10 to the selector 9 and processed in the second-layer memory 2, the adder 7, the selector 9 or the adder-subtracter 11 in a manner similar to those in the first-layer memory 1, the adder 6, the selector 8 or the adder-subtracter 10. Second-layer pixels are stored in the second-layer memory 2 with the formation of a third-layer pixel. That is, the controller 5 sets each of the write enable signal we2 and the chip enable signal ce2 to a high level and supplies the high-level signals we2 and ce2 to the second-layer memory 2. The address supply circuit 4 supplies, to the address terminals AD of the first-layer memory 1, the upper nine bits ha2 to ha10 (excluding the least significant bit ha0 and the ha1 bit which is one bit higher in position than the least significant bit ha0) which are part of the horizontal address HA output by the address generation circuit 4A, and the upper nine bits va2 to va10 (excluding the least significant bit va0 and the va1 bit which is one bit higher in position than the least significant bit va0) which are part of the vertical address VA. Further, the address supply circuit 4 outputs the ha1 bit (which is one bit higher in position than the least significant bit ha0) of horizontal address HA and the va1 bit (which is one hit higher in position than the least significant bit va0) of vertical address VA as a control signal to the selector 9.

At each of the times of inputting 2×2 four second-layer pixels m(2m, 2n), m(2m+1, 2n), m(2m, 2n+1), and m(2m+1, 2n+1) used to obtain third-layer pixel q(m, n) to input/output terminal DIO1 of the selector 9, the address supply circuit 4 outputs a signal designating the same address (m, n) in the second-layer memory 2 to the second-layer memory 2.

The selector 9 outputs, from through one of its input/output terminals IO1, IO2, IO3, or DIO2, the second-layer pixel supplied to its input/output terminal DIO1 based on the control signal ha1 and va1 from the address supply circuit 4. That is, when each of the control signals ha1 and va1 is 0, i.e., when second-layer pixel m(2m, 2n) is input to the input/output terminal DIO1 of the selector 9, the selector 9 outputs the pixel m(2m, 2n) from the input/output terminal IO1. When the control signals ha1 and va1 are 1 and 0, respectively, i.e., when second-layer pixel m(2m+1, 2n) is input to the input/output terminal DIO1, the selector 9 outputs the pixel m(2m+1, 2n) from the input/output terminal IO2. When the control signals ha1 and va1 are 0 and 1, respectively, i.e., when second-layer pixel m(2m, 2n+1) is input to the input/output terminal DIO1, the selector 9 outputs the pixel m(2m, 2n+1) from the input/output terminal IO3. When each of control signals ha1 and va1 is 1, i.e., when second-layer pixel m(2m+1, 2n+1) is input to the input/output terminal DIO1, the selector 9 outputs the pixel m(2m+1, 2n+1) from the input/output terminal DIO2.

Thus, the selector 9 outputs second-layer pixel m(2m, 2n), m(2m+1, 2n), m(2m, 2n+1), or m(2m+1, 2n+1) from its input/output terminal IO1, IO2,IO3, or DIO2 to the data terminal D1, D2, or D3 of the second-layer memory 2 or to the adder-subtracter 11.

In the second-layer memory 2, data supplied to the data terminals D1 to D3 is stored with address (m, n) in a manner similar to that in the first-layer memory 1.

A memory cell of the second-layer memory 2 may be formed in a manner similar to that of the memory cell of the first-layer memory 1 shown in FIG. 3. However, since each second-layer pixel is represented by ten bits as mentioned above, a memory cell of the second-layer memory 2 is formed so as to be capable of storing three pixels each represented by ten bits or thirty bits of data.

The selector 9 generates, based on control signals ha1 and va1 from the address supply circuit 4, mask bit signal mb for controlling writing of each bit to a memory cell of the second-layer memory 2 and supplies the mask bit signal mb to the mask bit terminal MB of the second-layer memory 2. That is, when each of the control signals ha1 and va1 is 0, i.e., when pixel m(2m, 2n) is output from the input/output terminal IO1 of the selector 9 to the data terminal D1 of the second-layer memory 2, the selector 9 supplies the second-layer memory 2 with the mask bit signal mb for masking the group of ten bits next to the first group of ten bits and the final group of ten bits (for inhibiting writing of these bits) in the memory cell with address (m, n). When the control signals ha1 and va1 are 1 and 0, respectively, i.e., when pixel m(2m+1, 2n) is output from the input/output terminal IO2 of the selector 9 to the data terminal D2 of the second-layer memory 2, the selector 9 supplies the second-layer memory 2 with the mask bit signal mb for masking the first group of ten bits and the final group of ten bits in the memory cell with address (m, n). When the control signals ha1 and va1 are 0 and 1, respectively, i.e., when pixel m(2m, 2n+1) is output from the input/output terminal IO3 of the selector 9 to the data terminal D3 of the second-layer memory 2, the selector 9 supplies the second-layer memory 2 with the mask bit signal mb for masking the first group of ten bits and the next group of ten bits in the memory cell with address (m, n).

As a result, in the second-layer memory 2, at the time of being supplied with the pixel m(2m, 2n), m(2m+1, 2n), or m(2m, 2n+1), only the pixel m(2m, 2n), m(2m+1, 2n), or m(2m, 2n+1) is written as a first, second or final group of ten bits in the memory cell with address (m, n).

As described above, of the 2×2 four second-layer pixels m(2m, 2n), m(2m+1, 2n), m(2m, 2n+1), and m(2m+1, 2n+1) used to obtain the third-layer pixel q(m, n), only three pixels m(2m, 2n), m(2m+1, 2n), and m(2m, 2n+1) are written to the second-layer memory 2 (and the final input pixel m(2m+1, 2n+1) is not written to the second-layer memory).

When each of the control signals ha1 and va1 is 1, the second-layer pixel m(2m+1, 2n+1) is output from the selector 9 to the adder-subtracter 11, as described above. In such situation, the controller 5 sets the write enable signal we2 to a low level. That is, when each of the control signals ha1 and va1 supplied from the address supply circuit 4 is 1, the controller 5 changes the write enable signal we2 from a high level to a low level and supplies the low-level write enable signal we2 to the second-layer memory 2. Under this condition, the second-layer memory 2 is in a reading state and data stored with address (m, n) from the address supply circuit 4 (that is, the three second-layer pixels m(2m, 2n), m(2m+1, 2n), and m(2m, 2n+1) already stored) are simultaneously read out. That is, these three pixels m(2m, 2n), m(2m+1, 2n), and m(2m, 2n+1) are respectively output from data terminals D1 to D3 of the second-layer memory 2 and supplied to the adder 7.

The adder 7 computes the sum of three pixels m(2m, 2n), m(2m+1, 2n), and m(2m, 2n+1) received from the second-layer memory 2 and supplies the obtained sum value to the adder-subtracter 11. The adder-subtracter 11 computes the sum of the sum value received from the adder 7 and pixel m(2m+1, 2n+1) from the selector 9 to obtain third-layer pixel q(m, n) (=m(2m, 2n)+m(2m+1, 2n)+m(2m, 2n+1)+m(2m+1, 2n+1). The pixel q(m, n) is output from the adder-subtracter 11 and supplied to the data terminal D of the third-layer memory 3.

Thus, at the time of being supplied with the final input pixel m(2m+1, 2n+1) of the 2×2 four second-layer pixels m(2m, 2n), m(2m+1, 2n), m(2m, 2n+1), and m(2m+1, 2n+1) used to obtain the third layer pixel q(m, n), that is, when the final input pixel m(2m+1, 2n+1) is obtained and output to the selector 9 as described with reference to FIG. 10 with respect to the adder-subtracter 10, the three second-layer pixels m(2m, 2n), m(2m+1, 2n), and m(2m, 2n+1) already stored with address (m, n) in the second-layer memory 2 are simultaneously read out. By using these pixels and the final input pixel m(2m+1, 2n+1), the third-layer pixel q(m, n) is obtained. That is, each of the 2×2 four second-layer pixels m(2m, 2n), m(2m+1, 2n), m(2m, 2n+1), and m(2m+1, 2n+1) used to obtain third layer pixel q(m, n) is obtained as follows. The second-layer pixel m(2m, 2n) is obtained from the four first-layer pixels h(4m, 4n), h(4m+1, 4n), h(4m, 4n+1), and h(4m+1, 4n+1), the second-layer pixel m(2m+1, 2n) is obtained from the four first-layer pixels h(4m+2, 4n), h(4m+3, 4n), h(4m+2, 4n+1), and h(4m+3, 4n+1), the second-layer pixel m(2m, 2n+1) is obtained from the four first-layer pixels h(4m, 4n+2), h(4m+1, 4n+2), h(4m, 4n+3), and h(4m+1, 4n+3), and the second-layer pixel m(2m+1, 2n+1) is obtained from the four first-layer pixels h(4m+2, 4n+2), h(4m+3, 4n+2), h(4m+2, 4n+3), and h(4m+3, 4n+3). The third-layer pixel q(m, n) is obtained from the obtained 2×2 four second-layer pixels m(2m, 2n), m(2m+1, 2n), m(2m, 2n+1), and m(2m+1, 2n+1).

The third-layer pixel q(m, n) is written to the third-layer memory 3 as described below.

The second-layer pixel m(s, t) is obtained in the adder-subtracter 10 after the first-layer pixels h(2s, 2t), h(2s+1, 2t), h(2s, 2t+1), and h(2s+1, 2t+1) have been input to the selector 8. At the time of being supplied with each of these pixels, the address generation circuit 4A outputs address (2s, 2t), (2s+1, 2t), (2s, 2t+1), or (2s+1, 2t+1). The upper nine bits of each of horizontal address HA and vertical address VA are supplied as an address to the second-layer memory 2 so that the same address is supplied to the second-layer memory 2 with respect to the times of inputting the four first-layer pixels h(2s, 2t), h(2s+1, 2t), h(2s, 2t+1), and h(2s+1, 2t+1) for obtaining one second-layer pixel m(s, t).

However, the second-layer pixel m(s, t) is obtained in the adder-subtracter 10 at the time of being supplied with pixel h(2s+1, 2t+1). At each of the times of being supplied with pixels h(2s, 2t), h(2s+1, 2t), and h(2s, 2t+1), the second-layer pixel m(s, t) is not yet obtained. Therefore, the writing operation should not be performed at the time of being supplied with pixel h(2s, 2t), h(2s+1, 2t), and h(2s, 2t+1), but should only be performed at the time of being supplied with the pixel h(2s+1, 2t+1), which enables the second-layer pixel m(s, t) to be obtained.

The controller 5 sets the chip enable signal ce2 to a high level only when each of the least significant bits ha0 and va0 of horizontal address HA and vertical address VA supplied as a control signal from the address supply circuit 4 is 1. The controller 5 sets the chip enable signal ce2 to a low level under the other conditions.

The third-layer pixel q(m, n) supplied from the adder-subtracter 11 to the data terminal D of the third-layer memory 3 as described above is stored in the third-layer memory 3. That is, the controller 5 sets each of the write enable signal we3 and the chip enable signal ce3 to a high level and supplies the high-level signals we3 and ce3 to the third-layer memory 3. The address supply circuit 4 changes the horizontal address HA and the vertical address VA output by the address generation circuit 4A (in a manner similar to that in the supply of addresses to the second-layer memory 2) so as to supply the upper nine bits ha2 to ha10 of the horizontal address HA and the upper nine bits va2 to va10 of the vertical address VA to the address terminals AD of the third-layer memory 3.

Thus, address (m, n) corresponding to the position of third-layer pixel q(m, n) is supplied to the third-layer memory 3. As a result, the third-layer pixel q(m, n) supplied from adder-subtracter 11 is stored at address (m, n) in the third-layer memory 3.

In the adder-subtracter 11, the third-layer pixel q(m, n) is obtained after the second-layer pixels m(2m, 2n), m(2m+1, 2n), m(2m, 2n+1), and m(2m+1, 2n+1) have been input to the selector 9. Further, the second-layer pixel m(2m, 2n) is obtained after the four first-layer pixels h(4m, 4n), h(4m+1, 4n), h(4m, 4n+1), and h(4m+1, 4n+1) have been input; the second-layer pixel m(2m+1, 2n) is obtained after the four first-layer pixels h(4m+2, 4n), h(4m+3, 4n), h(4m+2, 4n+1), and h(4m+3, 4n+1) have been input; the second-layer pixel m(2m, 2n+1) is obtained after the four first-layer pixels h(4m, 4n+2), h(4m+1, 4n+2), h(4m, 4n+3), and h(4m+1, 4n+3) have been input; and the second-layer pixel m(2m+1, 2n+1) is obtained after the four first-layer pixels h(4m+2, 4n+2), h(4m+3, 4n+2), h(4m+2, 4n+3), and h(4m+3, 4n+3) have been input.

The address generation circuit 4A output addresses (4m, 4n), (4m+1, 4n), (4m, 4n+1), (4m+1, 4n+1), (4m+2, 4n), (4m+3, 4n), (4m+2, 4n+1), (4m+3, 4n+1), (4m, 4n+2), (4m+1, 4n+2), (4m, 4n+3), (4m+1, 4n+3), (4m+2, 4n+2), (4m+3, 4n+2), (4m+2, 4n+3), and (4m+3, 4n+3) at the times of being supplied with the 4×4 sixteen first-layer pixels (h(4m, 4n), h(4m+1, 4n), h(4m, 4n+1), h(4m+1, 4n+1), h(4m+2, 4n), h(4m+3, 4n), h(4m+2, 4n+1), h(4m+3, 4n+1), h(4m, 4n+2), h(4m+1, 4n+2), h(4m, 4n+3), h(4m+1, 4n+3), h(4m+2, 4n+2), h(4m+3, 4n+2), h(4m+2, 4n+3), and h(4m+3, 4n+3), respectively.

The upper nine bits of each of horizontal address HA and vertical address VA output by the address generation circuit 4A are also supplied as an address to the third-layer memory 3. Accordingly, at each of the times of being supplied with the above-mentioned 4×4 sixteen first-layer pixels for obtaining one third-layer pixel q(m, n), the same address (m, n) is supplied to the third-layer memory 3.

However, in the adder-subtracter 11, the third-layer pixel q(m, n) is obtained at the time of being supplied with pixel h(4m+3, 4n+3) in the above-mentioned 4×4 sixteen first-layer pixels (with respect to the second layer, when pixel m(2m+1, 2n+1) is input). At each of the other times in which the other fifteen first-layer pixels are supplied, the third-layer image q(m, n) is not obtained. Therefore, the writing operation should not be performed at the time of being supplied with one of such fifteen first-layer pixels, but should only be performed at the time of being supplied with the pixel h(4m+3, 4n+3), which enables the third-layer pixel q(m, n) to be obtained.

The controller 5 sets the chip enable signal ce3 to a high level only when each of the least significant bits ha0 and va0 of horizontal address HA and vertical address VA supplied as a control signal from the address supply circuit 4 is 1 and when each of bits ha1 and va1 (which are one bit higher in position than the least significant bit) is 1. The controller 5 sets the chip enable signal ce3 to a low level under the other conditions.

As described above, with respect to the relationship between the first layer and the second layer, pixels in the lower or first layer stored in the first-layer memory 1 are read out as unit groups each having three first-layer pixels, that is, three of the 2×2 first-layer pixels h(2s, 2t), h(2s+1, 2t), h(2s, 2t+1), and h(2s+1, 2t+1) used to form a pixel in the upper or second layer, excluding the final input pixel h(2s+1, 2t+1). Therefore, the first-layer memory 1 may perform a function similar to that of a delay circuit which may externally connected as in the previously mentioned arrangement of FIG. 16. Thus, without utilizing such a delay circuit, the image corresponding to the second layer can be written from the image corresponding to the first layer. Also, with respect to the relationship between the second layer and the third layer, pixels in the lower or second layer stored in the second-layer memory 2 are read out as unit groups each having three second-layer pixels, that is, three of the 2×2 second-layer pixels m(2m, 2n), m(2m+1, 2n), m(2m, 2n+1), and m(2m+1, 2n+1) used to form a pixel in the upper or third layer, excluding the final input pixel m(2m+1, 2n+1). Therefore, the second-layer memory 2 may perform a function similar to that of a delay circuit which may be externally connected as in the previous arrangement of FIG. 16. Thus, without utilizing such a delay circuit, the image corresponding to the third layer can be written from the image corresponding to the second layer.

A description will now be provided for reading first-, second-, and third-layer images written in the above described manner. To facilitate in the explanation thereof, the reading will be described in the order of the third layer, second layer and first layer.

In reading the third-layer image, the address supply circuit 4 supplies the third-layer memory 3 with the same address as that at the time of writing, and the controller 5 sets the write enable signal we3 to a low level and supplies the third-layer memory 3 with the low-level write enable signal we3. Further, the controller 5 supplies the third-layer memory 3 with the same chip enable signal ce3 as that at the time of writing. That is, since the upper nine bits of each of horizontal address HA and vertical address VA is supplied as an address from the address supply circuit 4 to the third-layer memory 3, address (m, n) is supplied to the third-layer memory 3 each of the times addresses (4m, 4n), (4m+1, 4n), (4m, 4n+1), (4m+1, 4n+1), (4m+2, 4n), (4m+3, 4n), (4m+2, 4n+1), (4m+3, 4n+1), (4m, 4n+2), (4m+1, 4n+2), (4m, 4n+3), (4m+1, 4n+3), (4m+2, 4n+2), (4m+3, 4n+2), (4m+2, 4n+3), and (4m+3, 4n+3) are outputted from the address generation circuit 4A.

Under the above condition, a third-layer pixel can be read out sixteen times from the same address in the third-layer memory 3. To avoid such repeated reading from the same address, the controller 5 is arranged to set the chip enable signal ce3 to a high level only when each of the least significant bits ha0 and va0 of horizontal address HA and vertical address VA supplied as a control signal from the address supply circuit 4 is 1 and when each of the bits ha1 and va1 (which are one bit higher in position than the least significant bit) is 1, and to set the chip enable signal ce3 to a low level under the other conditions.

Consequently, addresses (m, n) represented by variables m and n having integer values in the range of 0 to 479 and 0 to 269, respectively, are supplied to the third-layer memory 3 in line scanning order so that third-layer pixels q(m, n) stored with the corresponding addresses are read out. The read out third-layer pixels q(m, n) are output from the data terminal D of the third-layer memory 3 in line scanning order.

The reading of the second-layer image will now be described.

In this case, the address supply circuit 4 supplies the second-layer memory 2 with an address formed of the upper nine bits of each of horizontal address HA and vertical address VA while supplying the third-layer memory 3 with the above-described address, as at the time of writing.

The controller 5 supplies the second-layer memory 2 with low-level write enable signal we2 while supplying the third-layer memory 3 with write enable signal we3 and chip enable signal ce3 such as those described above. Further, the controller 5 supplies the second-layer memory 2 with the same chip enable signal ce2 as that at the time of writing.

Therefore, in this case, reading of data (second-layer pixels) in the second-layer memory 2 is performed only at the time of outputting address (2s+1, 2t+1) from among the times of outputting addresses (2s, 2t), (2s+1, 2t), (2s, 2t+1), and (2s+1, 2t+1) as combinations (HA, VA) of horizontal address HA and vertical address VA from the address generation circuit 4A.

Further, the address supply circuit 4 supplies the second-layer memory 2 with an address formed of the upper nine bits of each of horizontal address HA and vertical address VA output from the address generation circuit 4A such that address (m, n) is supplied to the second-layer memory 2 at each of the times addresses (4m, 4n), (4m+1, 4n), (4m, 4n+1), (4m+1, 4n+1), (4m+2, 4n), (4m+3, 4n), (4m+2, 4n+1), (4m+3, 4n+1), (4m, 4n+2), (4m+1, 4n+2), (4m, 4n+3), (4m+1, 4n+3), (4m+2, 4n+2), (4m+3, 4n+2), (4m+2, 4n+3), and (4m+3, 4n+3) are outputted from the address generation circuit 4A.

Therefore, reading of data from the second-layer memory 2 is performed at the times of outputting addresses (4m+1, 4n+1), (4m+3, 4n+1), (4m+1, 4n+3), and (4m+3, 4n+3) from among the times of outputting addresses (4m, 4n), (4m+1, 4n), (4m, 4n+1), (4m+1, 4n+1), (4m+2, 4n), (4m+3, 4n), (4m+2, 4n+1), (4m+3, 4n+1), (4m, 4n+2), (4m+1, 4n+2), (4m, 4n+3), (4m+1, 4n+3), (4m+2, 4n+2), (4m+3, 4n+2), (4m+2, 4n+3), and (4m+3, 4n+3) from the address generation circuit 4A. Consequently, address (m, n) is supplied to the second-layer memory 2 at each of the times of outputting addresses (4m+1, 4n+1), (4m+3, 4n+1), (4m+1, 4n+3), and (4m+3, 4n+3) from the address generation circuit 4A, and data is read out from the address (m, n).

Additionally, three second-layer pixels m(2m, 2n), m(2m+1, 2n), and m(2m, 2n+1) are stored with address (m, n) in the second-layer memory 2. At each of the times of outputting addresses (4m+1, 4n+1), (4m+3, 4n+1), (4m+1, 4n+3), and (4m+3, 4n+3) from the address generation circuit 4A, the three second-layer pixels m(2m, 2n), m(2m+1, 2n), and m(2m, 2n+1) are simultaneously read out from the second-layer memory 2 and outputted therefrom through the data terminals D1 to D3, respectively. Also, at each of the times of outputting addresses (4m+1, 4n+1), (4m+3, 4n+1), and (4m+1, 4n+3) from the address generation circuit 4A, three second-layer pixels m(2m, 2n), m(2m+1, 2n), and m(2m, 2n+1) output from the data terminals D1 to D3 of the second-layer memory 2 are supplied to input/output terminals IO1 to IO3 of the selector 9.

Figure 12:
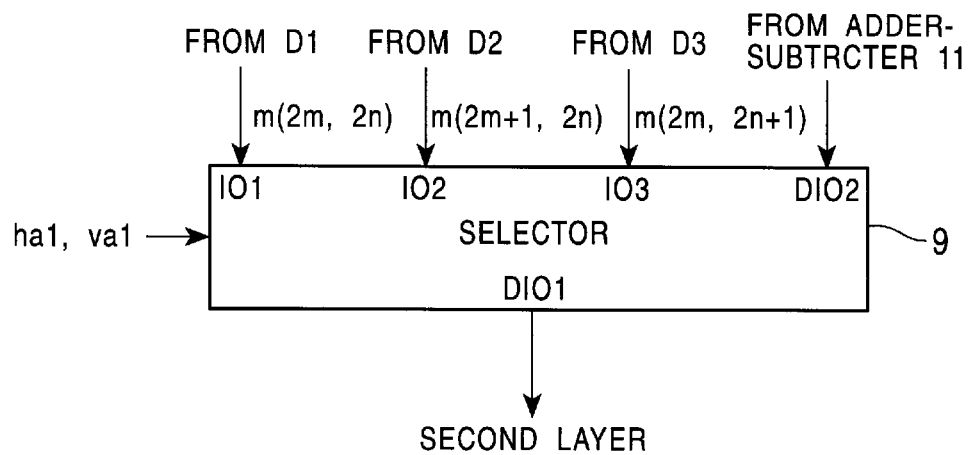
FIG. 12 is a diagram to which reference will be made in explaining processing performed by a selector of the apparatus of FIG. 2.

With reference to FIG. 12, the selector 9 selects, as a result of reading the second-layer image, one of the three second-layer pixels m(2m, 2n), m(2m+1, 2n), and m(2m, 2n+1) supplied to its input/output terminals IO1 to IO3 or an output from the adder-subtracter 11 supplied to its input/output terminal DIO2 in accordance with control signals ha1 and va1 from the controller 5, and outputs the selected item from its input/output terminal DIO1. That is, when each of the control signals ha1 and va1 is 0, i.e., when the address generation circuit 4A outputs address (4m+1, 4n+1), the selector 9 selects second-layer pixel (2m, 2n) supplied from the data terminal D1 of the second-layer memory 2 to the input/output terminal IO1 of the selector 9 and outputs the selected pixel from its input/output terminal DIO1. When the control signals ha1 and va1 are 1 and 0, respectively, i.e., when the address generation circuit 4A outputs address (4m+3, 4n+1), the selector 9 selects second-layer pixel (2m+1, 2n) supplied from the data terminal D2 of the second-layer memory 2 to the input/output terminal IO2 of the selector 9 and outputs the selected pixel from its input/output terminal DIO1. When the control signals ha1 and va1 are 0 and 1, respectively, i.e., when the address generation circuit 4A outputs address (4m+1, 4n+3), the selector 9 selects second-layer pixel (2m, 2n+1) supplied from the data terminal D3 of the second-layer memory 2 to the input/output terminal IO3 of the selector 9 and outputs the selected pixel from its input/output terminal DIO1. When each of the control signals ha1 and va1 is 1, i.e., when the address generation circuit 4A outputs address (4m+3, 4n+3), the selector 9 selects data supplied from the adder-subtracter 11 to its input/output terminal DIO2 and outputs the selected data from its input/output terminal DIO1.

As such, when the address generation circuit 4A outputs address (4m+3, 4n+3), three second-layer pixels m(2m, 2n), m(2m+1, 2n), and m(2m, 2n+1) may be output from the data terminals D1 to D3 of the second-layer memory 2 and supplied to the adder 7 to obtain the sum of the values of these pixels. This sum value may be supplied to the adder-subtracter 11.

Further, when the address generation circuit 4A outputs address (4m+3, 4n+3), third-layer pixel q(m, n) may be read out from the third-layer memory 3, as described above. This third-layer pixel q(m, n) may be output to the outside as a result of reading the third-layer image and may also be supplied to the adder-subtracter 11.

The adder-subtracter 11 subtracts the sum value received from the adder 7 from the third-layer pixel q(m, n) to obtain second-layer pixel m(2m+1, 2n+1) (=q(m, n)−(m(2m, 2n)+m(2m+1, 2n)+m(2m, 2n+1))) and supplies the same to the input/output terminal DIO2 of the selector 9. The selector 9 may select and output the received second-layer pixel m(2m+1, 2n+1).

Figure 13:
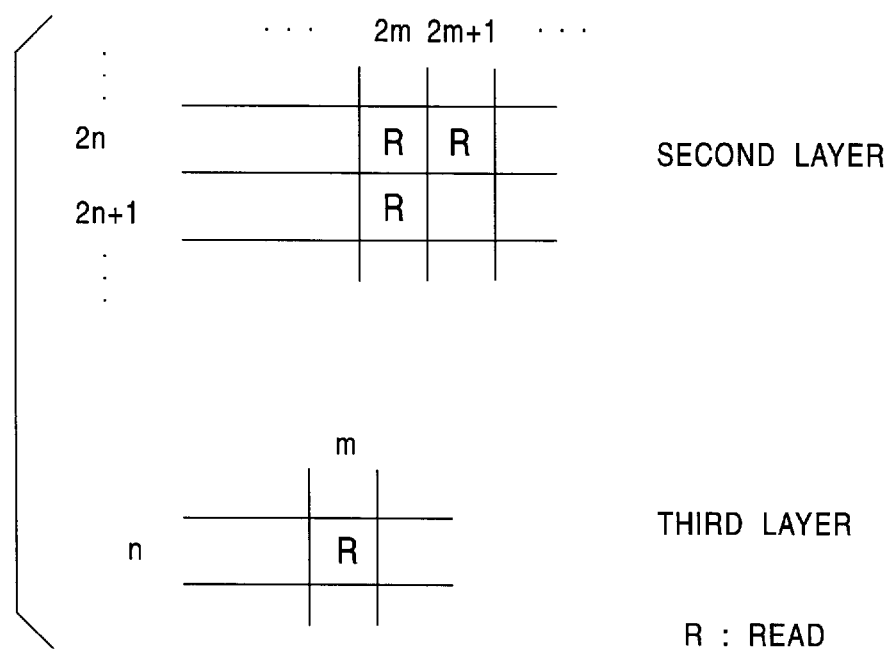
FIG. 13 is a diagram to which reference will be made in explaining the formation of a second-layer pixel.
Figure 14:
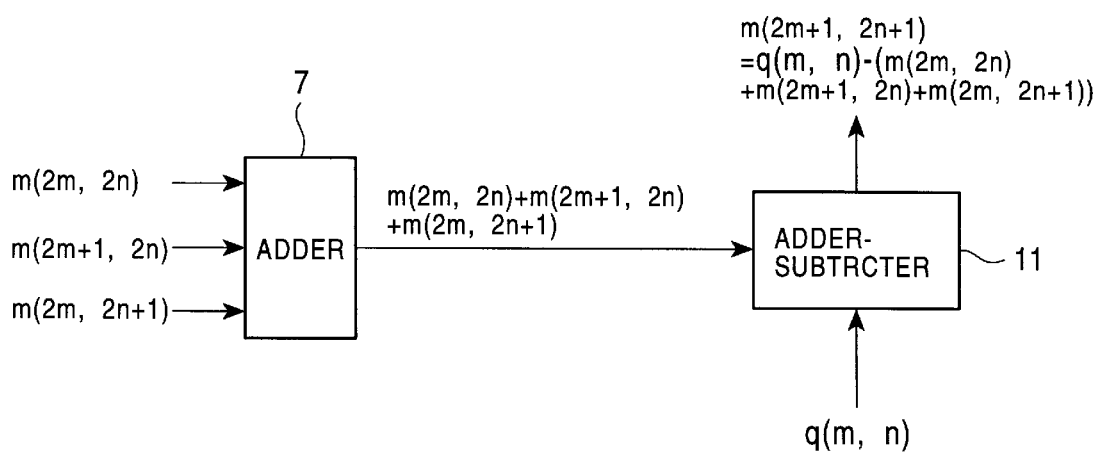
FIG. 14 is a diagram to which reference will be made in explaining processing performed by an adder and an adder-subtracter of the apparatus of FIG. 2.

Thus, as shown in FIG. 13, three second-layer pixels m(2m, 2n), m(2m+1, 2n), and m(2m, 2n+1) may be simultaneously read out from the second-layer memory 2, and third-layer pixel q(m, n) may be read out from the third-layer memory 3. Then, as shown in FIG. 14, the adder 7 computes the sum of the three second-layer pixels m(2m, 2n), m(2m+1, 2n), and m(2m, 2n+1) read out from the second-layer memory 2 and supplies the sum value to the adder-subtracter 11 which subtracts the sum value from third-layer pixel q(m, n) to obtain second-layer pixel m(2m+1, 2n+1) which was not stored at the time of writing. This second-layer pixel m(2m+1, 2n+1) is supplied to the input/output terminal DIO2 of the selector 9 and is output from the input/output terminal DIO1.

Reading of the first-layer image will now be described.

In this situation, the address supply circuit 4 supplies the first-layer memory 1 with an address formed of the upper ten bits of each of horizontal address HA and vertical address VA and supplies the second-layer memory 2 and the third-layer memory 3 with the above-described addresses, as it does at the time of writing. The controller 5 supplies the first-layer memory 1 with low-level write enable signal we1 and supplies the second-layer memory 2 and/or the third-layer memory 3 with write enable signal we2 and/or we3 and chip enable signal ce2 and/or ce3 such as those described above. Further, the controller 5 supplies the first-layer memory 1 with the same chip enable signal ce1 as at the time of writing (chip enable signal ce1 at high level).

Accordingly, in this situation, address (s, t) is supplied to the first-layer memory 1 at each of the times of outputting addresses (2s, 2t), (2s+1, 2t), (2s, 2t+1), and (2s+1, 2t+1) as combinations (HA, VA) of horizontal address HA and vertical address VA from the address generation circuit 4A, and three-first layer pixels h(2s, 2t), h(2s+1, 2t), and h(2s, 2t+1) stored with address (s, t) are simultaneously read and respectively outputted from the data terminals D1 to D3 of the first-layer memory 1. At each of the times of outputting addresses (2s, 2t), (2s+1, 2t), and (2s, 2t+1) from the address generation circuit 4A, the three first-layer pixels h(2s, 2t), h(2s+1, 2t), and h(2s, 2t+1) output from the data terminals D1 to D3 of the first-layer memory 1 are respectively supplied to the input/output terminals IO1 to IO3 of the selector 8.

The selector 8 selects, as a result of reading the first-layer image, one of the three first-layer pixels h(2s, 2t), h(2s+1, 2t), and h(2s, 2t+1) supplied to its input/output terminals IO1 to IO3 and an output from the adder-subtracter 10 supplied to its input/output terminal DIO2 in accordance with control signals ha0 and va0 from the controller 5, and outputs the selected data from its input/output terminal DIO1. That is, when each of the control signals ha0 and va0 is 0, i.e., when the address generation circuit 4A outputs address (2s, 2t), the selector 8 selects the first-layer pixel (2s, 2t) supplied from the data terminal D1 of the first-layer memory 1 to its input/output terminal IO1 and outputs the selected pixel from its input/output terminal DIO1. When the control signals ha0 and va0 are 1 and 0, respectively, i.e., when the address generation circuit 4A outputs address (2s+1, 2t), the selector 8 selects first-layer pixel (2s+1, 2t) supplied from the data terminal D2 of the first-layer memory 1 to its input/output terminal IO2 and outputs the selected pixel from its input/output terminal DIO1. When the control signals ha0 and va0 are 0 and 1, respectively, i.e., when the address generation circuit 4A outputs address (2s, 2t+1), the selector 8 selects first-layer pixel (2s, 2t+1) supplied from the data terminal D3 of the first-layer memory 1 to its input/output terminal IO3 and outputs the selected pixel from its input/output terminal DIO1. When each of the control signals ha0 and va0 is 1, i.e., when the address generation circuit 4A outputs address (2s+1, 2t+1), the selector 8 selects data supplied from the adder-subtracter 10 to its input/output terminal DIO2 and outputs the selected data from its input/output terminal DIO1.

As such, when the address generation circuit 4A outputs address (2s+1, 2t+1), three first-layer pixels h(2s, 2t), h(2t+1, 2t), and h(2s, 2t+1) are output from the data terminals D1 to D3 of the first-layer memory 1 and supplied to the adder 6 to obtain the sum of the values of these pixels. The obtained sum value is supplied to the adder-subtracter 10.

Further, when the address generation circuit 4A outputs address (2s+1, 2t+1), second-layer pixel m(s, t) is output from the input/output terminal DIO1 of the selector 9, as described above. This second-layer pixel m(s, t) may be output to the outside as a result of reading the second-layer image and may also be supplied to the adder-subtracter 10.

The adder-subtracter 10 subtracts the sum value received from the adder 6 from second-layer pixel m(s, t) to obtain first-layer pixel h(2s+1, 2t+1) (=m(s, t)−(h(2s, 2t)+h(2s+1, 2tn)+h(2s, 2t+1))) and supplies the same to the input/output terminal DIO2 of the selector 8. The selector 8 may select and output the received first-layer pixel h(2s+1, 2t+1).

Figure 15:
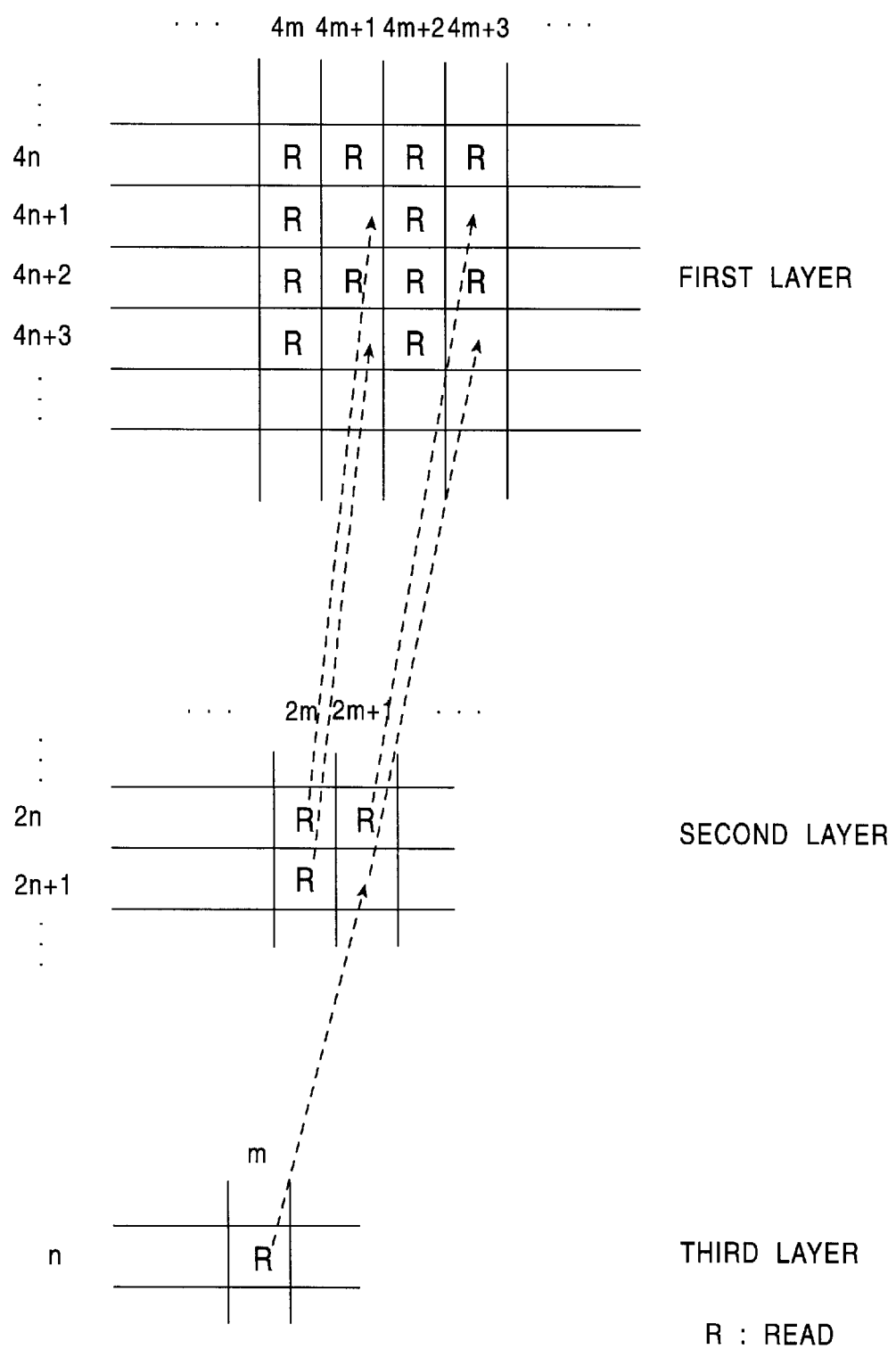
FIG. 15 is a diagram to which reference will be made in explaining the formation of first-layer pixels.

Thus, when the address generation circuit 4A outputs address (2s+1, 2t+1) which is represented by (4m+1, 4n+1), three first-layer pixels h(4m, 4n), h(4m+1, 4n), and h(4m, 4n+1) may be simultaneously read out from the first-layer memory 1 and second-layer pixel m(2m, 2n) may be read out from the second-layer memory 2, as shown in FIG. 15. Then, the adder 6 may compute the sun of the three first-layer pixels h(4m, 4n), h(4m+1, 4n) and h(4m, 4n+1) and supply the sum value to the adder-subtracter 10 which may subtract the same from second-layer pixel m(2m, 2n) to obtain first-layer pixel h(4m+1, 4n+1) which was not stored at the time of writing. This first-layer pixel h(4m+1, 4n+1) may be supplied to the input/output terminal DIO2 of the selector 8 and outputted from the input/output terminal DIO1 thereof.

When the address generation circuit 4A outputs address (2s+1, 2t+1) which is represented by (4m+3, 4n+1), three first-layer pixels h(4m+2, 4n), h(4m+3, 4n), and h(4m+2, 4n+1) may be simultaneously read out from the first-layer memory 1 and second-layer pixel m(2m+1, 2n) may be read out from the second-layer memory 2, as shown in FIG. 15. Then, the adder 6 may compute the sum of the three first-layer pixels h(4m+2, 4n), h(4m+3, 4n), and h(4m+2, 4n+1) and supply the sum value to the adder-subtracter 10 which may subtract the same from second-layer pixel m(2m+1, 2n) to obtain first-layer pixel h(4m+3, 4n+1) which was not stored at the time of writing. This first-layer pixel h(4m+3, 4n+1) may be supplied to the input/output terminal DIO2 of the selector 8 and output from the input/output terminal DIO1 thereof.

When the address generation circuit 4A outputs address (2s+1, 2t+1) which is represented by (4m+1, 4n+3), three first-layer pixels h(4m, 4n+2), h(4m+1, 4n+2), and h(4m, 4n+3) may be simultaneously read out from the first-layer memory 1 and second-layer pixel m(2m, 2n+1) may be read out from the second-layer memory 2, as shown in FIG. 15. Then, the adder 6 may compute the sum of three first-layer pixels h(4m, 4n+2), h(4m+1, 4n+2), and h(4m, 4n+3) and supply the sum value to the adder-subtracter 10 which may subtract the same from second-layer pixel m(2m, 2n+1) to obtain first-layer pixel h(4m+1, 4n+3) which was not stored at the time of writing. This first-layer pixel h(4m+1, 4n+3) may be supplied to the input/output terminal DIO2 of the selector 8 and output from the input/output terminal DIO1 thereof.

When the address generation circuit 4A outputs address (2s+1, 2t+1) which is represented by (4m+3, 4n+3), three second-layer pixels m(2m, 2n), m(2m+1, 2n), m(2m, 2n+1) may be simultaneously read out from the second-layer memory 2 and third-layer pixel q(m, n) may also be read out from the third-layer memory 3, as shown in FIG. 15. From these pixels, second-layer pixel m(2m+1, 2n+1) may be obtained in the above-described manner and supplied from the input/output terminal DIO1 of the selector 9 to the adder-subtracter 10. Further, in this case, three first-layer pixels h(4m+2, 4n+2), h(4m+3, 4n+2), and h(4m+2, 4n+3) may be simultaneously read out from the first-layer memory 1 and supplied to the adder 6 so as to compute the sum of the values of these pixels. Such sum value may be supplied to the adder-subtracter 10 which may subtract the same from second-layer pixel m(2m+1, 2n+1) received from the selector 9 to obtain first-layer pixel h(4m+3, 4n+3) which was not stored at the time of writing. This first-layer pixel h(4m+3, 4n+3) may be output by way of the input/output terminal DIO2 and the input/output terminal DIO1 of the selector 8.

As described above, with respect to the relationship between the first layer and the second layer, pixels in the lower or first layer stored in the first-layer memory 1 are read out as unit groups each having three first-layer pixels, that is, three of the 2×2 first-layer pixels h(2s, 2t), h(2s+1, 2t), h(2s, 2t+1), and h(2s+1, 2t+1) used to form a pixel in the upper or second layer and excluding final input pixel h(2s+1, 2t+1). Therefore, the first-layer memory 1 has a function similar to that of a delay circuit externally connected as in the previously-described arrangement. Thus, without such a delay circuit, the first-layer image can be read out while obtaining the first-layer pixels not stored at the time of writing. Also, with respect to the relationship between the second layer and the third layer, pixels in the lower or second layer stored in the second-layer memory 2 are read out as unit groups each having three second-layer pixels, that is, three of the 2×2 second-layer pixels m(2m, 2n), m(2m+1, 2n), m(2m, 2n+1), and m(2m+1, 2n+1) used to form a pixel in the upper or third layer and excluding final input pixel m(2m+1, 2n+1). Therefore, the second-layer memory 1 has a function similar to that of a delay circuit externally connected as in the previously-described arrangement. Thus, without such a delay circuit, the second-layer image can be read out while obtaining the second-layer pixels not stored at the time of writing.

As a result, the present apparatus may have a relatively small size and may be capable of high-speed reading of images corresponding to different layers.

In the above-described embodiment, address designation is performed by supplying each of the first-layer memory 1, the second-layer memory 2 and the third-layer memory 3 with portions of horizontal address HA and vertical address VA output by the address generation circuit 4A. However, the present invention is not limited to such addressing method.

In the above-described embodiment, horizontal and vertical addresses corresponding to the position in horizontal and vertical directions of each of pixels forming an image are supplied to each of the first-layer memory 1, the second-layer memory 2 and the third-layer memory 3 for access to the same. However, other techniques for accessing the first-layer memory 1, the second-layer memory 2 and the third-layer memory 3 may be utilized. For example, an address on a time base may be utilized wherein second-layer or third-layer pixels may be formed by adding first-layer pixels scattered with time as well as first-layer pixels scattered along spatial directions (horizontal and vertical directions).

Further, in the present invention, each of the first-layer memory, the second-layer memory and the third-layer memory does not have to be formed as a memory separate from the others. As an alternative, the three memories may be combined into one memory having storage areas allocated to correspond to the first, second and third memories 1, 2, and 3.

Each of the components of the storage apparatus shown as blocks in FIG. 2, not particularly specified above, can be formed as an independent integrated circuit, and the entire arrangement may be constructed on a one-chip complementary metal oxide semiconductor (CMOS) structure or the like.

In the above-described embodiment, the number of bits assigned to each first-layer pixel is 8, and the data lengths of memory cells of the first-layer memory 1, the second-layer memory 2 and the third-layer memory 3 are set to 8, 10, and 12 bits, respectively, avoiding omission of digits for first-, second-, and third-layer pixels. However, the present invention is not so limited. As an alternative, the data lengths of memory cells of the first-layer memory 1, the second-layer memory 2 and the third-layer memory 3 may be uniformly set to 8 bits. However, in such situation, a value obtained by discarding two lower bits of the sum of 2×2 first-layer or second-layer pixels (a value corresponding to a quarter of the sum, i.e., the average) is stored as each of second- or third-layer pixels. As a result, omission of digits occurs and reversibility of the data is lost. That is, if omission of digits is prevented, first-layer and second-layer pixels (pixel values) not stored can be accurately obtained by the equations shown above. However, if omission of digits occurs, first-layer and second-layer pixels not stored may be obtained not as accurate values but as approximate values.

In the above-described embodiment, a progressive image is processed to be hierarchically coded. However, the present invention is not so limited and may be applicable to an interlaced image.

Although the above-described embodiment has three (3) layers, the present invention is not so limited. Alternatively, the present invention may have 2, 4, or more layers.

In the above-described embodiment, the sum of the values of 2×2 four pixels of a lower layer is set as a pixel (pixel value) of an adjacent higher layer. However, the method of forming a pixel of a higher layer is not so limited. If a pixel of a higher layer is formed from N pixels other than four pixels, each of the unit groups of pixels each having N−1 pixels from the first-layer memory 1 or second-layer memory may be read.

The storage apparatus shown in FIG. 1 is basically realized in hardware form. Alternatively, such storage apparatus may be realized by use of a computer program which performs the above-described processing.

In the above-described embodiment, pixels (pixel values) may be stored in a memory such as a random access memory (RAM) or the like. Alternatively, pixels may be stored (recorded) on a recording medium, such as a magnetic disk, a magneto-optical disk, a magnetic tape, a memory card or an optical card.

In the above-described embodiment, writing is performed with respect to unit groups of three pixels, as is reading of pixels from the first-layer memory 1 and the second-layer memory 2. Alternatively, writing may be performed with respect to a unit of one pixel.

As is apparent from the above description, images corresponding to layers can be simultaneously output from the storage apparatus, or an image corresponding to one layer alone can be read out.

The present invention can be applied to a still image or a moving image.

According to the storage apparatus and the writing method of the present invention, pixels of a lower-layer image are written and a unit group of N−1 pixels of the written lower-layer image is read out, one pixel of an upper-layer image is formed from the N−1 pixels constituting the lower layer image and one input pixel of the lower layer image for a total of N pixels, and the formed pixel of the upper layer image is written. Thus, one pixel of the upper-layer image may be obtained from N pixels of the lower-layer image and the obtained pixel may be stored without using additional delay devices for delaying the lower-layer image.

According to the storage apparatus and the writing method of the present invention, N−1 pixels of a lower layer image may be read out from the lower layer storage device, and one of the N−1 pixels read out may be selected and output. A final input pixel of the lower layer image may be output which is formed from one pixel of an upper layer image stored in the upper layer storage device and the N−1 pixels of the lower layer image read out from the lower layer storage device of the N pixels of the lower layer image used to form the one pixel of the upper layer image. Thus, the final input pixel of the N pixels of the lower-layer image used to obtain one pixel of the upper-layer image may be obtained without using additional delay devices for delaying the lower-layer image.

What is claimed is:

1. A storage apparatus for storing a first image corresponding to a low layer and having a plurality of pixels and a second image corresponding to a high layer and having a plurality of pixels, in which a pixel of the second image is formed from N pixels of the first image, and in which the pixels of the first image are inputted one by one in a predetermined order, said apparatus comprising:

a low layer storage device for storing the first image corresponding to the low layer;

a high layer storage device for storing the second image corresponding to the high layer;

a controller for controlling read and write operations with respect to said low layer and high layer storage devices, said controller reading out the first image stored in said low layer storage device as a unit group of N−1 pixels; and a pixel generator for generating one pixel of the second image by using the N pixels of the first image which include the N−1 pixels of the first image read out from said low layer storage device and one input pixel of the first image.

2. A storage apparatus according to claim 1, wherein said controller reads out the first image stored in said low layer storage device as the unit group of N−1 pixels by designating an address of said low layer storage device in accordance with parts of a vertical address and a horizontal address which respectively correspond to a position in a vertical direction and a position in a horizontal direction of pixels of the first image.

3. A storage apparatus according to claim 1, wherein said low layer storage device stores only N−1 pixels and excludes a final input pixel of the N pixels of the first image used to form the one pixel of the second image, the final input pixel is inputted in the N pixels of the first image, and said controller reads out the corresponding N−1 pixels of the first image with a timing corresponding to the inputting of the final input pixel in the N pixels of the first image.

4. A storage apparatus according to claim 1, wherein said pixel generator includes a first adder for adding values of the N−1 pixels read out from said low layer storage device to generate an added value, and a second adder for adding the added value and a value of a final input pixel to generate the one pixel of the second image.

5. A storage apparatus according to claim 3, wherein said pixel generator includes a first adder for adding values of the N−1 pixels read out from said low layer storage device to generate an added value, and a second adder for adding the added value and a value of the final input pixel to generate the one pixel of the second image.

6. A storage apparatus according to claim 1, wherein said low layer storage device stores only N−1 pixels and excludes a final input pixel of the N pixels of the first image used to form the one pixel of the second image, the final input pixel is inputted in the N pixels of the first image, said controller reads out the one pixel of the second image in said high layer storage, said pixel generator generates the final input pixel of the first image by using the one pixel of the second image read out from said high layer storage device and the N−1 pixels of the first image read out from said low layer storage device, the final input pixel not being stored in said low layer storage device, and said apparatus further comprises a selector for selecting one of N−1 pixels of the first image read out from said low layer and the final input pixel.

7. A storage apparatus according to claim 6, wherein said pixel generator includes a first adder for adding values of the N−1 pixels read out from said low layer storage device to generate an added value, and a subtractor for subtracting the added value from a value of the corresponding one of the pixels of the second image to generate the final input pixel of the first image.

8. A method for writing an image to a storage apparatus to store a first image corresponding to a low layer and having a plurality of pixels and a second image corresponding to a high layer and having a plurality of pixels, in which a pixel of the second image is formed from N pixels of the first image, and in which the pixels of the first image are inputted one by one in a predetermined order, said method comprising the steps of:

storing the first image corresponding to the low layer in a low layer storage device;

reading out the first image stored in said low layer storage device as a unit group of N−1 pixels;

generating one pixel of the second image by using the N pixels of the first image which include the N−1 pixels of the first image read out from said low layer storage device and one input pixel of the first image; and storing the second image corresponding to the high layer in a high layer storage device.

9. A method according to claim 8, wherein the reading step reads out the first image stored in said low layer storage device as the unit group of N−1 pixels by designating an address of said low layer storage device in accordance with parts of a vertical address and a horizontal address which respectively correspond to a position in a vertical direction and a position in a horizontal direction of pixels of the first image.

10. A method according to claim 8, wherein the step of storing the first image stores only N−1 pixels and excludes a final input pixel of the N pixels of the first image used to form the one pixel of the second image in said low layer storage device, the final input pixel is inputted in the N pixels of the first image, and said reading step reads out the corresponding N−1 pixels of the first image with a timing corresponding to the inputting of the final input pixel in the N pixels of the first image.

11. A method according to claim 8, wherein said generating step includes adding values of the N−1 pixels read out from said low layer storage device to generate an added value, and adding the added value and a value of a final input pixel to generate the one pixel of the second image.

12. A method according to claim 10, wherein said generating step includes adding values of the N−1 pixels read out from said low layer storage device to generate an added value, and adding the added value and a value of the final input pixel to generate the one pixel of the second image.

13. A storage apparatus for storing a first image corresponding to a low layer and having a plurality of pixels and a second image corresponding to a high layer and having a plurality of pixels, in which a pixel of the second image is formed from N pixels of the first image, and in which the pixels of the first image are inputted one by one in a predetermined order, said apparatus comprising:

a low layer storage device for storing the first image corresponding to the low layer, said low layer storage device storing only N−1 pixels and excluding a final input pixel of the N pixels of the first image used to form the one pixel of the second image, the final input pixel is inputted in the N pixels of the first image and is not stored in said low layer storage device;

a high layer storage device for storing the second image corresponding to the high layer, said high layer storage device storing one pixel of the second image by using the N pixels of the first image which include the N−1 pixels of the first image read out from said low layer storage device and the final input pixel of the first image;

a controller for controlling read and write operations with respect to said low layer and high layer storage devices, said controller reading out the one pixel of the second image in said high layer storage, said controller reading out the first image stored in said low layer storage device as a unit group of N−1 pixels; and a pixel generator for generating the final input pixel of the first image by using the one pixel of the second image read out from said high layer storage device and the N−1 pixels of the first image read out from said low layer storage device.

14. A storage apparatus according to claim 13, wherein said controller reads out the first image stored in said low layer storage device as the unit group of N−1 pixels by designating an address of said low layer storage device in accordance with parts of a vertical address and a horizontal address which respectively correspond to a position in a vertical direction and a position in a horizontal direction of pixels of the first image.

15. A storage apparatus according to claim 13, wherein said pixel generator includes an adder for adding values of the N−1 pixels read out from said low layer storage device to generate an added value, and a subtractor for subtracting the added value from a value of the corresponding one pixel of the second image to generate the final input pixel of the first image.

16. A method for reading out an image from a storage apparatus for storing a first image corresponding to a low layer and having a plurality of pixels and a second image corresponding to a high layer and having a plurality of pixels, in which a pixel of the second image is formed from N pixels of the first image, in which the pixels of the first image are inputted one by one in a predetermined order, and in which said storage apparatus includes a low layer storage device for storing the first image corresponding to the low layer, said low layer storage device storing only N−1 pixels and excluding a final input pixel of the N pixels of the first image used to form the one pixel of the second image, the final input pixel is inputted in the N pixels of the first image and is not stored in said low layer storage device, and a high layer storage device storing the second image corresponding to the high layer, said high layer storage device storing one pixel of the second image by using the N pixels of the first image which include the N−1 pixels of the first image read out from said low layer storage device and the final input pixel of the first image, said method comprising the steps of:

reading out the one pixel of the second image in said high layer storage device;

reading out the first image stored in said low layer storage device as a unit group of N−1 pixels; and generating the final input pixel of the first image by using the one pixel of the second image read out from said high layer storage device and the N−1 pixels of the first image read out from said low layer storage device.

17. A method according to claim 16, wherein the step of reading reads out the first image stored in said low layer storage device as the unit group of N−1 pixels by designating an address of said low layer storage device in accordance with parts of a vertical address and a horizontal address which respectively correspond to a position in a vertical direction and a position in a horizontal direction of pixels of the first image.

18. A method according to claim 16, wherein said generating step includes adding values of the N−1 pixels read out from said low layer storage device to generate an added value, and subtracting the added value from a value of the corresponding one pixel of the second image to generate the input pixel of the first image.

19. A method for writing in and reading out an image from a storage apparatus to store a first image corresponding to a low layer and having a plurality of pixels and a second image corresponding to a high layer and having a plurality of pixels, in which a pixel of the second image is formed from N pixels of the first image, and in which the pixels of the first image are inputted one by one in a predetermined order, said method comprising the steps of:

storing the first image corresponding to the low layer in a low layer storage device, the first image storing step stores only N−1 pixels and excludes a final input pixel of the N pixels of the first image used to form the one pixel of the second image, the final input pixel is inputted in the N pixels of the first image;

reading out the first image stored in said low layer storage device as a unit group of N−1 pixels;

generating one pixel of the second image by using the N pixels of the first image which include the N−1 pixels of the first image read out from said low layer storage device and one input pixel of the first image;

storing the second image corresponding to the high layer in a high layer storage device;

reading out the one pixel of the second image in said high layer storage; and generating the final input pixel of the first image by using the one pixel of the second image read out from said high layer storage device and the N−1 pixels of the first image read out from said low layer storage device, the final input pixel is not stored in said low layer storage device.

20. A method according to claim 19, wherein the step of reading reads out the first image stored in said low layer storage device as the unit group of N−1 pixels by designating an address of said low layer storage device in accordance with parts of a vertical address and a horizontal address which respectively correspond to a position in a vertical direction and a position in a horizontal direction of pixels of the first image.

21. A method according to claim 19, wherein the step of storing the first image stores only N−1 pixels and excludes a final input pixel of the N pixels of the first image used to form the one pixel of the second image in said low layer storage device; and the first image reading step reads out the corresponding N−1 pixel of the first image with a timing corresponding to the inputting of the final input pixel in the N pixels of the image.

22. A method according to claim 19, wherein the step of generating one pixel includes adding values of the N−1 pixels read out from said low layer storage device to generate an added value, and adding the added value and a value of the final input pixel to generate the one pixel of the second image.

23. A method according to claim 21, wherein the step of generating one pixel includes adding values of the N−1 pixels read out from said low layer storage device to generate an added value, and adding the added value and a value of the final input pixel to generate the one pixel of the second image.

24. A method according to claim 19, wherein the step of generating the final input pixel includes adding values of the N−1 pixels read out from said low layer storage device to generate an added value, and subtracting the added value from a value of the corresponding one pixel of the second image to generate the final input pixel of the first image.

25. A method according to claim 19, said method further comprising the step of generating the final input pixel of the first image from the one pixel of the second image stored in said high layer storage device and the N−1 pixels of the first image stored in said low layer storage device, the final input pixel is not stored in said low layer storage device.

* * * * *